(12) United States Patent
Andreae et al.

(10) Patent No.: US 11,685,607 B2
(45) Date of Patent: Jun. 27, 2023

(54) CONVEYOR SYSTEM WITH AUTOMATED CARRIERS

(71) Applicant: SST Systems, Inc., Sturgeon Bay, WI (US)

(72) Inventors: Chad Martin Andreae, Sturgeon Bay, WI (US); Bradley M. Andreae, Sturgeon Bay, WI (US); Stephen C. Mann, Sturgeon Bay, WI (US); Anthony C. Scoville, Sturgeon Bay, WI (US)

(73) Assignee: SST SYSTEMS, INC., Sturgeon Bay, WI (US)

( * ) Notice: Subject to any disclaimer, the term of this patent is extended or adjusted under 35 U.S.C. 154(b) by 331 days.

(21) Appl. No.: 17/196,243

(22) Filed: Mar. 9, 2021

(65) Prior Publication Data
US 2021/0188559 A1    Jun. 24, 2021

Related U.S. Application Data

(63) Continuation of application No. 16/376,142, filed on Apr. 5, 2019, now Pat. No. 10,947,049.
(Continued)

(51) Int. Cl.
*B65G 17/48* (2006.01)
*B65G 19/02* (2006.01)
(Continued)

(52) U.S. Cl.
CPC ......... *B65G 17/485* (2013.01); *B65G 19/025* (2013.01); *B65G 19/185* (2013.01);
(Continued)

(58) Field of Classification Search
CPC .. B65G 17/485; B65G 19/025; B65G 19/185; B65G 43/00; B65G 9/002; B65G 9/006;
(Continued)

(56) References Cited

U.S. PATENT DOCUMENTS

| 1,711,401 A | 4/1929 | Baldwin et al. |
| 3,495,720 A | 2/1970 | Mann, Jr. et al. |

(Continued)

FOREIGN PATENT DOCUMENTS

| DE | 102009017241 A1 | 10/2010 |
| GB | 1070176 A | 6/1967 |

(Continued)

OTHER PUBLICATIONS

International Search Report and Written Opinion for related Application No. PCT/IL2015/000004 dated Jun. 24, 2015 (8 Pages).
(Continued)

*Primary Examiner* — Thomas Randazzo
(74) *Attorney, Agent, or Firm* — Michael Best & Friedrich LLP

(57) ABSTRACT

A method of operating a conveyor system includes providing a fixed, non-powered first rail supporting first and second trolleys of a first carrier, at least one of which is self-driving. The first and second trolley are conveyed in line along the first rail with a load bar therebetween. The first carrier defines a length measured along the first rail and a width measured transverse. The first carrier is conveyed to a branch point where a second rail branches from the first rail. The second trolley is conveyed along the second the rail to turn the first carrier so that it is conveyed with the load bar traversing between the first and second rails. The width is substantially less than the length such that the turning of the first carrier reduces an occupancy of the first carrier along the first rail.

20 Claims, 16 Drawing Sheets

Related U.S. Application Data

(60) Provisional application No. 62/653,836, filed on Apr. 6, 2018.

(51) Int. Cl.
    *B65G 19/18*      (2006.01)
    *B65G 43/00*      (2006.01)
    *B65G 9/00*      (2006.01)

(52) U.S. Cl.
    CPC .............. *B65G 43/00* (2013.01); *B65G 9/002* (2013.01); *B65G 9/006* (2013.01); *B65G 9/008* (2013.01); *B65G 2203/0291* (2013.01); *B65G 2811/0673* (2013.01)

(58) Field of Classification Search
    CPC ............ B65G 9/008; B65G 2203/0291; B65G 2811/0673; B61B 10/00
    See application file for complete search history.

(56) References Cited

U.S. PATENT DOCUMENTS

| | | |
|---|---|---|
| 3,541,971 A | 11/1970 | Drennan |
| 3,700,128 A | 10/1972 | Noble et al. |
| 3,949,679 A | 4/1976 | Barber |
| 4,286,911 A | 9/1981 | Benjamin |
| 4,570,543 A | 2/1986 | Ishikura et al. |
| 4,866,255 A | 9/1989 | Sing |
| 4,926,753 A | 5/1990 | Weiss |
| 5,012,749 A | 5/1991 | Passage, Jr. |
| 5,115,747 A | 5/1992 | Teissier et al. |
| 5,288,040 A | 2/1994 | Fox |
| 5,560,469 A * | 10/1996 | Ohara ....................... B66C 1/66 198/345.1 |
| 5,901,651 A | 5/1999 | Boyd |
| 5,924,545 A * | 7/1999 | Crorey ................... B65G 47/90 414/746.3 |
| 5,955,857 A | 9/1999 | Kwon et al. |
| 6,109,568 A | 8/2000 | Gilbert et al. |
| 6,367,612 B1 | 4/2002 | Dosso |
| 6,428,267 B1 * | 8/2002 | Terpstra ................... B23Q 7/04 212/319 |
| 6,446,560 B1 | 9/2002 | Slocum |
| 6,652,213 B1 | 11/2003 | Mitchell et al. |
| 7,599,756 B2 | 10/2009 | Reeves et al. |
| 7,917,245 B2 | 3/2011 | Murata |
| 8,186,499 B2 | 5/2012 | Brandt et al. |
| 8,428,796 B2 | 4/2013 | Donnelly |
| 8,504,195 B2 | 8/2013 | Dehne et al. |
| 9,016,464 B2 * | 4/2015 | Andreae ................. B65G 17/20 198/678.1 |
| 9,430,950 B2 * | 8/2016 | Hayashi ................... G08G 9/00 |
| 10,947,049 B2 | 3/2021 | Andreae et al. |
| 2004/0197172 A1 | 10/2004 | Hansl et al. |
| 2005/0150416 A1 | 7/2005 | Hori et al. |
| 2006/0069470 A1 | 3/2006 | Campbell et al. |
| 2006/0182526 A1 | 8/2006 | Weis |
| 2008/0152467 A1 | 6/2008 | Moritzhuber |
| 2009/0276082 A1 | 11/2009 | Murata |
| 2013/0313070 A1 | 11/2013 | Ogawa et al. |
| 2016/0011224 A1 | 1/2016 | Pollack |
| 2018/0222686 A1 * | 8/2018 | Takahara .......... H01L 21/67715 |
| 2019/0064036 A1 | 2/2019 | Watson |
| 2019/0105768 A1 | 4/2019 | Greenberg |
| 2019/0322456 A1 * | 10/2019 | Propp .................... B65G 47/61 |

FOREIGN PATENT DOCUMENTS

| | | |
|---|---|---|
| JP | S6019610 A | 1/1985 |
| JP | H10203647 A | 8/1998 |
| WO | WO2015118522 A1 | 8/2015 |

OTHER PUBLICATIONS

Extended European Search Report for related Application No. EP15746439 dated Jan. 16, 2017 (9 Pages).

* cited by examiner

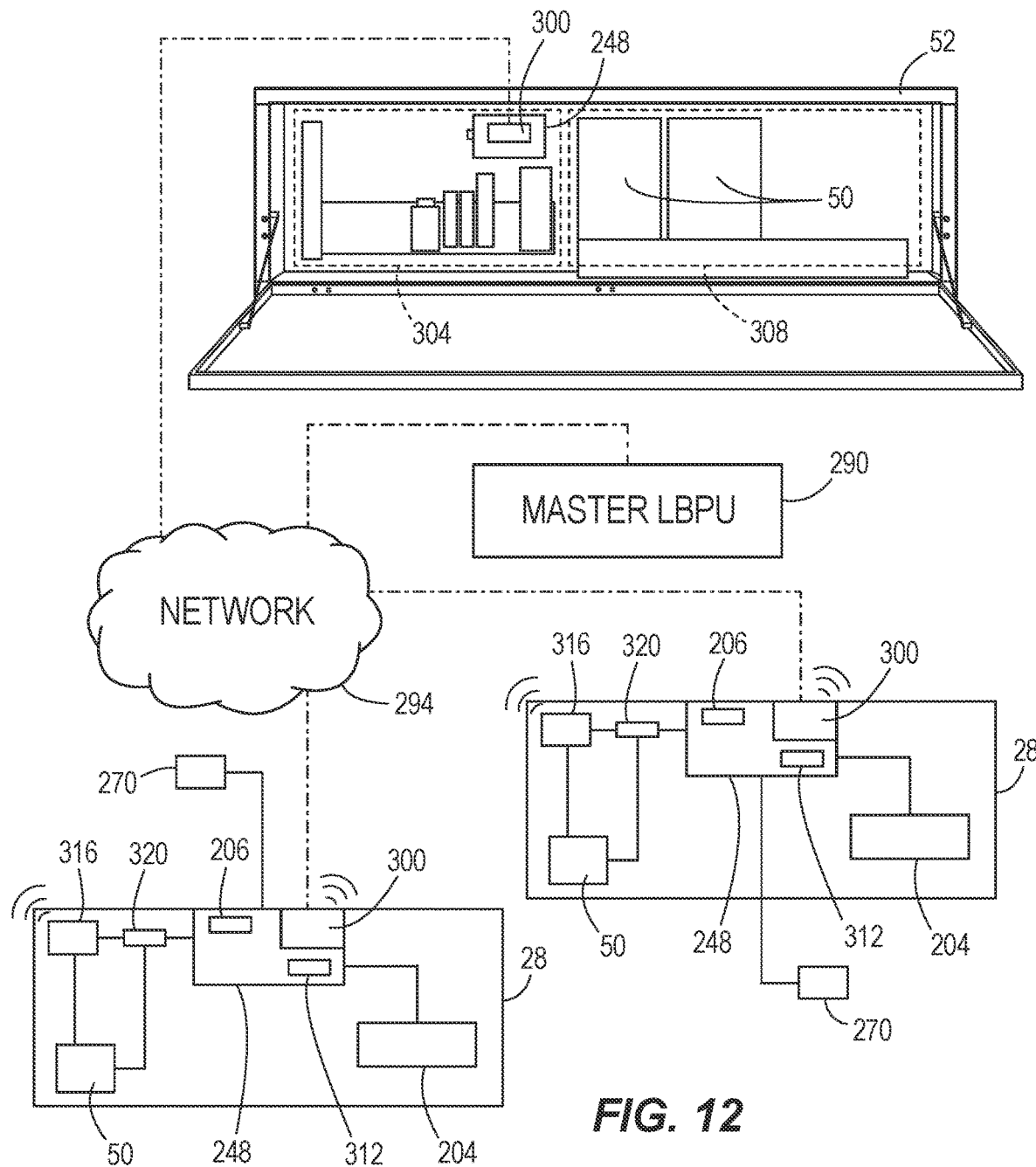

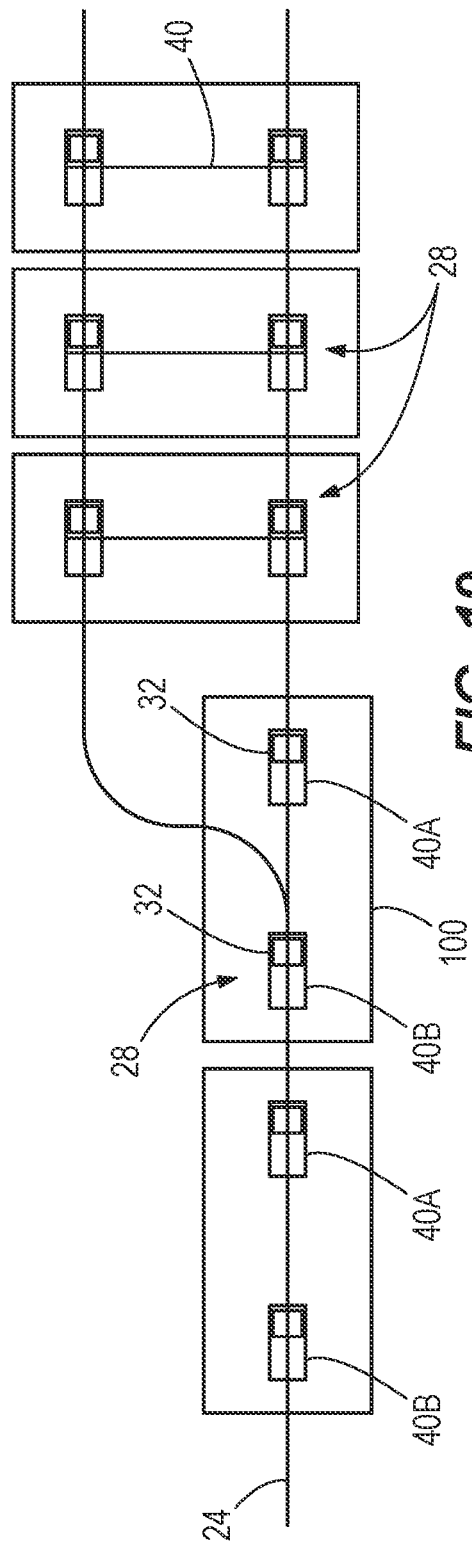
FIG. 19
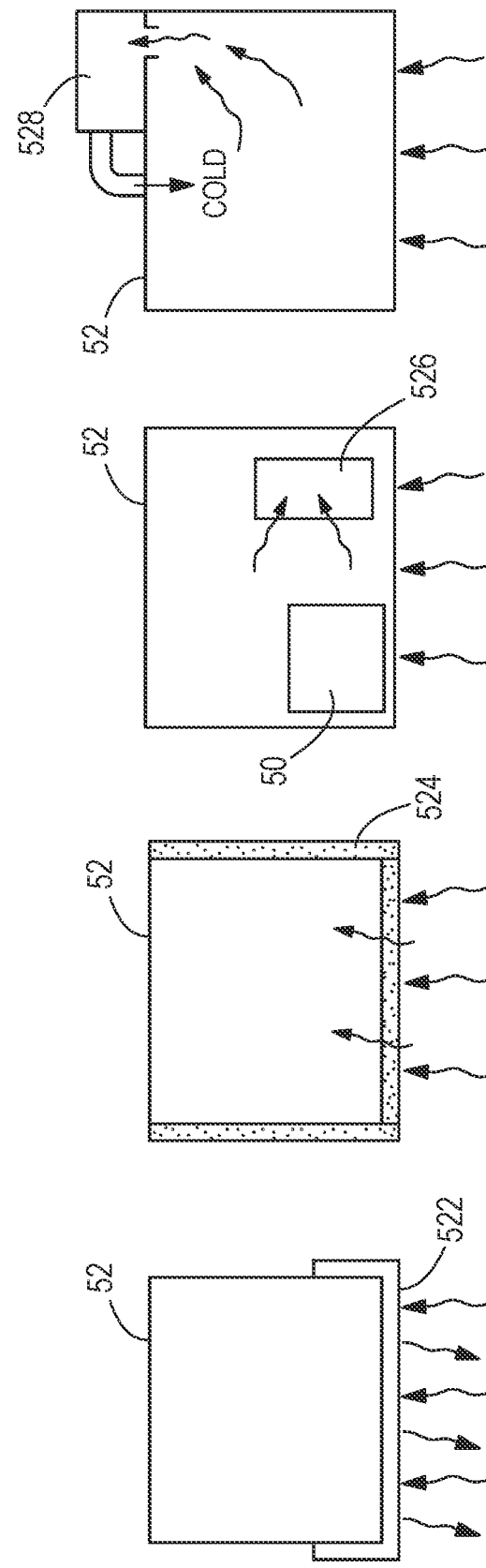
FIG. 20A
FIG. 20B
FIG. 20C
FIG. 20D

CONVEYOR SYSTEM WITH AUTOMATED CARRIERS

CROSS-REFERENCE TO RELATED APPLICATIONS

This application is a continuation of U.S. Non-Provisional patent application Ser. No. 16/376,142, filed on Apr. 5, 2019, which claims priority to U.S. Provisional Patent Application No. 62/653,836, filed on Apr. 6, 2018, the entire contents of both of which are incorporated by reference herein.

BACKGROUND

Power and Free Conveyor Systems—These systems can be both overhead and inverted. The system are dual rail systems with one rail providing power by means of a continuous moving chain and the second rail supporting the load carrying conveyor. The load carrying conveyor can be coupled or decoupled from the continuously moving power chain. The load carrying conveyor can be routed on different paths, but the paths are determined by a fixed infrastructure of conveyor rail.

Chainless Power and Free Conveyor Systems—This style of conveyor system is similar to the overhead power and free system, but in lieu of a continuous moving power chain it implements a rotating friction drive that can engage and disengage with the load carrier. Many drives are implemented to make this system operate and an intense electrical and pneumatic infrastructure is required to make if function correctly.

Electrified Monorail Conveyor Systems—These conveyor systems offer individual carrier control, but require that a power source (electrified rail) be run the entire conveyor length.

SUMMARY

In some embodiments, a conveyor system includes a conveyor rail and a plurality of automated carriers. The conveyor rail is a single passive, non-electrified, rail defining a track for the plurality of automated carriers. Each of the plurality of automated carriers includes a self-contained power supply and a self-contained drive mechanism for autonomously driving itself along the track defined by the conveyor rail. The conveyor system can be an overhead conveyor or an inverted conveyor.

In some embodiments, each of the plurality of automated carriers includes a microprocessor operable to control the drive mechanism to set drive parameters including travel distance, speed, and acceleration/deceleration according to preprogrammed instructions stored within a memory of the microprocessor. In some embodiments, one or more of the plurality of automated carriers is remotely re-programmed from a wireless remote controller during operation.

Some embodiments of the present invention provide each of the plurality of automated carriers with a wireless communication transceiver operable to control the drive mechanism to set drive parameters including travel distance, speed, and acceleration/deceleration according to a wireless signal received from a remote controller.

In some embodiments, each of the plurality of automated carriers includes an enclosure that is explosionproof, flame-tight, and/or dust-ignitionproof as defined by the NEC. In some embodiments, each of the plurality of automated carriers includes an enclosure that is hermetically sealed from the process environment with respect to flammable gases, vapors, and/or liquids. In some embodiments, each of the plurality of automated carriers includes an enclosure having an outer housing and a heat insulation layer.

In some embodiments, the conveyor system includes an intersection whereby an incoming automated conveyor carrier has the option of at least two outlet paths from a single switching point. The switching point includes a drive system for translating or rotating a rail portion. The drive system for the switching point includes no drive source of its own and is operated by the self-driving trolley of the automated conveyor carrier.

In some embodiments, an automated conveyor carrier includes two self-driving trolleys, and the conveyor system includes a branch rail that extends parallel to a main rail so that driving of the two self-driving trolleys on the main and branch rails turns the load carried by the automated conveyor carrier to a perpendicular orientation for enhanced close packing. In some constructions, the load density afforded by turning the loads is in excess of what is physically possible with only the main rail.

In some embodiments, the conveyor rail includes a straight portion leading to a curved portion, and the conveyor system is operated to accelerate the automated conveyor carriers leading into the curved portion to generate sufficient gaps to avoid collision when navigating the curved portion. In some embodiments, the automated conveyor carriers are accelerated through at least an upstream part of the curved rail portion.

In some embodiments, operation of the conveyor system includes oscillating a first automated conveyor carrier back and forth along the rail at a work station, while a second adjacent automated conveyor carrier on the rail is stopped or conveyed along a first direction.

In some embodiments, operation of the conveyor system includes setting or changing a running speed of an automated conveyor carrier through a first work station based on at least one characteristic of the load supported. The characteristic can be weight. The weight can be represented by data provided to the automated conveyor carrier or can be measured.

In one aspect, the invention provides a conveyor system comprising a fixed, non-powered rail defining a conveyor path, an automated conveyor carrier (ACC) supported by the rail, and a sleep mode module on-board the ACC. The ACC includes an on-board motor, an on-board electrical power source, and an on-board controller selectively powering the on-board motor, the on-board controller comprising an inverter configured to power the on-board motor from the on-board electrical power source according to a drive signal from the on-board controller, and a wireless communication module configured to communicate electrical signals with at least one external wireless device. The sleep mode module includes a secondary wireless communication module and a processor, the sleep mode module configured to selectively turn on and turn off power from the on-board power source to the on-board controller. The ACC is operable in a first mode to power the on-board motor and drive the ACC along the rail according to the drive signal from the on-board controller. The ACC is operable in a second mode in which the on-board controller is actively energized, without driving the ACC along the rail. The ACC is operable in a third mode of operation, which is a sleep mode in which power to the on-board controller is shut off and the secondary wireless communication module is powered to wirelessly monitor for a wake signal, the sleep mode module configured to wake the ACC from the sleep mode by re-establishing power to the on-board controller in response to the wake signal.

In one aspect, the invention provides a method of operating a conveyor system. A fixed, non-powered rail is provided defining a conveyor path, the rail supporting an automated conveyor carrier (ACC) comprising an on-board motor, an on-board electrical power source, and an on-board controller selectively powering the on-board motor, the on-board controller comprising an inverter powering the on-board motor from the on-board electrical power source according to a drive signal from the on-board controller, and a wireless communication module communicating electrical signals with at least one external wireless device, the ACC having a load suspended therefrom. The ACC is operated in a first mode to power the on-board motor and drive the ACC along the rail according to the drive signal from the on-board controller. The ACC is operated in a second mode in which the on-board controller is actively energized, and the ACC remains idle without movement along the rail. The ACC is transitioned from the second mode into a third mode of operation, which is a sleep mode in which power to the on-board controller is shut off. A secondary wireless communication module on-board the ACC wirelessly monitors for a wake signal, the secondary wireless communication module re-establishing power to the on-board controller to wake the ACC from the sleep mode in receipt of the wake signal.

In one aspect, the invention provides a method of operating a conveyor system. A load is suspended from an automated conveyor carrier (ACC), and the ACC is suspended from a fixed, non-powered rail defining a conveyor path. The automated conveyor carrier (ACC) is driven along the rail by transmitting electrical power from an on-board battery pack of one or more batteries to an on-board motor under the control of an on-board controller. Secondary power is provided to the ACC while suspended from the rail along the conveyor path, the secondary power being provided by: on an outside of a first enclosure containing the on-board battery pack, disconnecting the motor from the on-board controller and the on-board battery pack, coupling a secondary battery and a secondary controller to the ACC, and connecting power between the secondary battery and the motor through the secondary controller. The ACC is driven along the rail by transmitting electrical power from the secondary battery to the motor through the secondary controller.

In one aspect, the invention provides a conveyor system including a fixed, non-powered rail defining a conveyor path, and an automated conveyor carrier (ACC) supported by the rail and drivable along the rail by an on-board motor in a self-driving trolley of the ACC, the motor powering a drive wheel. The rail defines a first section and a second section separate from the first section, and the conveyor system is adapted to provide a first amount of traction for the ACC on the rail in the first section and a second amount of traction, greater than the first amount of traction, in the second section.

In one aspect, the invention provides a method of constructing a conveyor system, the method including decommissioning an existing conveyor system by removing electrification or a powered chain from a conveyor rail, and removing unpowered carriers from the rail. An automated conveyor carrier (ACC) is installed onto the rail so that a drive wheel of a self-driving trolley of the ACC is put into contact with the rail. A battery is installed on the ACC. Electrical connection is established from the battery to the self-driving trolley.

In one aspect, the invention provides a conveyor system including a fixed, non-powered rail defining a conveyor path including an oven zone in which the rail extends through or over a heated oven chamber. At least one automated conveyor carrier (ACC) is suspended from the rail by a self-driving trolley having an on-board motor for driving the ACC along the rail, and by at least one additional free-rolling trolley. The ACC further comprises an enclosure containing one or both of an inverter and a battery, the enclosure having a wall defining an interior space of the enclosure. An active or passive heat protection system is provided in addition to the wall, the heat protection system operating to limit an internal temperature of the enclosure during transport along the oven zone.

In one aspect, the invention provides a method of operating a conveyor system. A fixed, non-powered rail is provided defining a conveyor path, the rail supporting first and second consecutive automated conveyor carriers (ACC), each of which includes a motor-powered self-driving trolley. A first load is suspended from the first ACC, and a second load is suspended from the second ACC. The first and second ACCs independently drive along the rail by executing instructions from independent on-board controllers of the first and second ACCs. A first spacing between the first and second ACCs is maintained through a first section of the rail, and the first ACC accelerates away from the second ACC to increase the spacing from the first spacing to a second spacing for navigating a second section of the rail, the second section being a curved section.

In one aspect, the invention provides a method of operating a conveyor system, including providing a fixed, non-powered first rail defining a conveyor path, the first rail supporting first and second trolleys of a first carrier, at least one of which is a self-driving trolley including an on-board motor and electrical power source. The first carrier is conveyed under its own power such that the second trolley trails the first trolley along the first rail with a load bar extended therebetween, the first carrier defining a length measured along a longitudinal extent of the first rail and a width measured transverse to the longitudinal extent of the first rail. The first carrier is conveyed to a branch point where a second rail branches from the first rail. The first trolley is conveyed along the first the rail and the second trolley is conveyed along the second the rail to turn the first carrier so that it is conveyed with its width in line with the longitudinal extent of the rail and with the load bar traversing between the first and second rails. The width is substantially less than the length such that the occupancy of the first carrier along the rail is substantially reduced by turning the first carrier.

In one aspect, the invention provides a conveyor system including a fixed, non-powered rail defining a conveyor path, and a plurality of automated conveyor carriers (ACC) supported on the rail to be movable along the conveyor path. Each of the plurality of ACCs includes an on-board motor and an on-board electrical power source selectively powering the on-board motor to drive the ACC along the rail, at least some of the plurality of ACCs having respective loads suspended therefrom. Each of the plurality of ACCs operates to power the on-board motor from the on-board electrical power source under the direction of instructions programmed to a local controller on the respective ACC. Each of the local controllers of the respective ACCs is programmed to carry out independent power level management for its own on-board electrical power source, including an adaptive low power indicator that communicates a low power status that is based in part on the power level of the on-board battery and further based in part on a location of the respective ACC along the conveyor path and/or a weight of the respective load suspended therefrom.

Other aspects of the invention will become apparent by consideration of the detailed description and accompanying drawings.

BRIEF DESCRIPTION OF THE DRAWINGS

FIG. 12 is a perspective view of the interior of an electronics enclosure of the automated conveyor carrier, and a schematic representation of a control system in communication with a plurality of automated conveyor carriers.

FIG. 19 is a plan view of a portion of the conveyor system including a parallel secondary rail to provide load turning and enhanced close-packing of automated conveyor carriers.

FIG. 20A is a schematic view of a heat-shielded electronics enclosure.

FIG. 20B is a schematic view of an insulated heat-shielded electronics enclosure.

FIG. 20C is a schematic view of an electronics enclosure including a passive heat absorbing device.

FIG. 20D is a schematic view of an electronics enclosure including an active air conditioning system.

Figure 1:
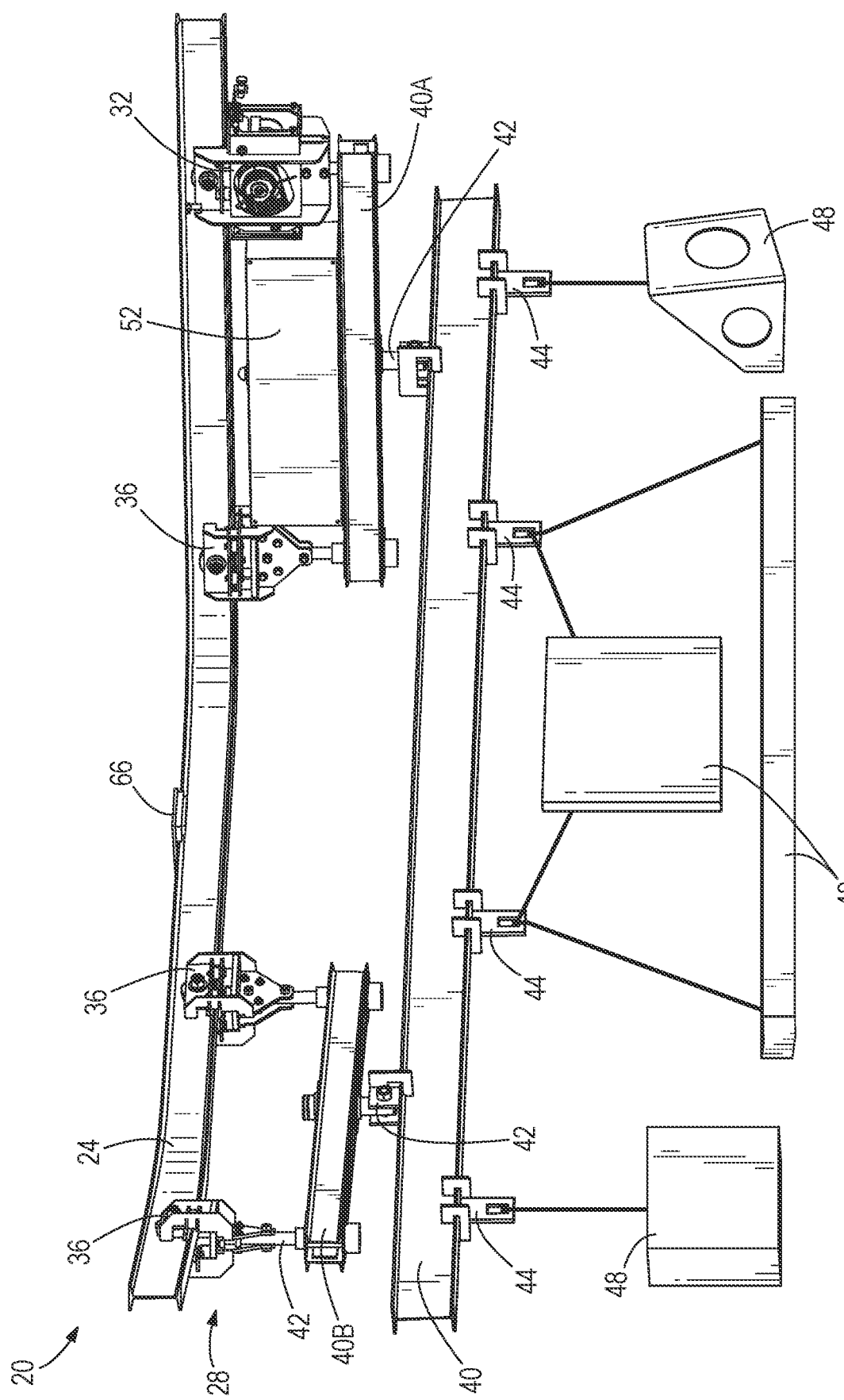
FIG. 1 is a perspective view of a portion of a conveyor system including an automated conveyor carrier according to an embodiment of the present invention.

The present invention is further described with reference to the accompanying drawings, which show an embodiment of the present invention. However, it should be noted that the invention as disclosed in the accompanying drawings is illustrated by way of example only. The various elements and combinations of elements described below and illustrated in the drawings can be arranged and organized differently to result in constructions which are still within the spirit and scope of the present invention.

DETAILED DESCRIPTION

Before any embodiments of the invention are explained in detail, it is to be understood that the invention is not limited in its application to the details of construction and the arrangement of components set forth in the following description or illustrated in the accompanying drawings.

FIG. 1 illustrates a conveyor system 20 including a conveyor track or rail 24 and at least one carrier assembly 28, or simply carrier 28. The carrier 28 includes at least one component (referred to herein as "trolleys") engaged with the rail 24 to follow a path defined by the rail 24 through a process (e.g., a treatment such as cleaning, painting, electroplating, powder coating, etc.). As illustrated, the carrier 28 is an Automated Conveyor Carrier (ACC) having a self-driving trolley 32. In addition to the self-driving trolley 32, the ACC 28 may further include one or more additional free-rolling trolleys 36, with the trolleys 32, 36 supporting a load bar 40 on which a work piece support structure 44 such as hook(s), rack(s), or basket(s) is mounted to transport loads or work pieces 48 for conveyance. The load bar 40 can be supported directly or indirectly by the trolleys 32, 36. As illustrated, the load bar 40 is supported indirectly by the trolleys 32, 36 by intermediate load bars 40A, 40B, each of which is secured between a corresponding trolley set (e.g., pair). Each intermediate load bar 40A, 40B is coupled to the load bar 40 with a joint 42, such as a swivel joint. Additional joints 42 are provided as couplings between the intermediate load bars 40A, 40B and the respective trolleys 32, 36 so that curves in the conveyor rail 24 can be navigated. The first trolley set, shown on the right side of FIG. 1, includes the self-driving trolley 32 and one free-rolling trolley 36 supporting the first intermediate load bar 40A. The second trolley set, shown on the left side of FIG. 1, includes two free-rolling trolleys 36 supporting the second intermediate load bar 40B. Aspects of the invention can also be realized in constructions having a single trolley pair supporting the load bar 40 (with or without intermediate load bars 40A, 40B), or one or more trolley sets including trolleys numbering greater than two. As discussed in further detail below, each trolley 32, 36 can include one or more wheels for rolling along the rail 24. In the illustrated construction where the load bars 40, 40A, 40B and the work pieces 48 are suspended to hang by gravity below the rail 24, the intermediate load bars 40A, 40B are upper load bars and are coupled to a top edge of the load bar 40. Any or all of the load bars 40, 40A, 40B can have an I-beam or modified I-beam cross-section, an example of which is further illustrated in FIG. 9, although other geometries are optional, such as hollow-box and C-channel, among others.

Although the ACC 28 may be operated as a "tugger" in which the self-driving trolley 32 is positioned at a leading end of the ACC 28, it is also conceived that the ACC 28 may operate, at times or predominantly, as a "pusher" in which the self-driving trolley 32 is positioned at a trailing end of the ACC 28. In fact, the self-driving trolley 32 may be located anywhere along the length of the ACC 28, and in some cases multiple self-driving trolleys 32 may be used in one ACC 28, multiple ACCs 28 may be linked together, and/or the self-driving trolley 32 of a given ACC 28 may be surrounded fore and aft by free-rolling trolleys 36.

The ACC 28 allows complete individual control of the carrier in path, speed, and acceleration and deceleration. The ACC 28 is electrically powered for driving itself along the conveyor rail 24, and the electrical drive power is supplied by one or more (e.g., four series-connected 12-volt) batteries 50 (e.g., lead acid, or lithium-ion) of the ACC 28. The batteries 50 are located on-board the ACC 28 (e.g., within a housing or enclosure 52 thereof) to establish a self-contained power source that is not dependent upon energy supply from the conveyor rail 24 or anything external to the ACC 28, such as an additional power supply rail, during operation. The enclosure 52 having the batteries 50 moves with the drive end of the ACC 28—in other words, the end having the self-driving trolley 32. However, the enclosure 52 is not fixed securely to the self-driving trolley 32. Rather, the enclosure 52 can be securely fixed to the intermediate load bar 40A (e.g., through one or more standoff rails 54, FIGS. 2 and 4). Thus, the joints 42 allow a limited amount of swiveling between the enclosure 52 and the respective trolleys 32, 36. The enclosure 52 is positioned between the trolleys 32, 36 of the drive end of the ACC 28. As such, the enclosure 52 spans over top of the joint 42 that couples the intermediate load bar 40A and the main load bar 40. In some constructions, as shown, the enclosure 52 extends along a majority of the length of the intermediate load bar 40A. As discussed further below, the enclosure 52 may also contain further electronics, rather than just the batteries 50. The electronics can include a plurality of devices of different types and functions, and may be related to the driving control of the self-driving trolley 32 and particularly the delivery of power from the batteries 50 to a motor 204 of the self-driving trolley 32. The batteries 50 can be charged periodically at a charging station or simply charger 66, as further described below, which may be located along a portion of the rail 24 that is actively utilized for ACC transport between functional work stations or work locations in a factory floor setting, or alternately, remote therefrom although connected.

Implementing the conveyor system 20 having the ACC 28 requires very minimal electrical and pneumatic infrastructure and eliminates the need for power and free conveyor drives and take-ups. Installation time can be considerably reduced over the other styles of power and free rail configurations. The conveyor system 20 with one or more of the ACCs 28 can be used in an industrial setting in conjunction with automated guided vehicle systems and with traditional conveyor technology, including but not limited to monorail, floor conveyor, power & free, etc. For example, any one or more of these other systems can be used to deliver and/or pick up parts to/from the conveyor system 20. In some constructions, the invention includes construction of the conveyor system 20 by retrofitting a pre-existing powered-rail conveyor system (e.g., a power and free conveyor, chainless power and free conveyor, or electrified monorail conveyor). In such a construction, the method can include the removal of some or all of the power lines within or along the rails 24, as they are unnecessary with the ACCs 28. In other words, the conveyor system 20 can be constructed by a process including decommissioning an existing conveyor system by removing electrification or a powered chain from a conveyor rail, and removing unpowered carriers from the rail 24. In other constructions, the conveyor system 20 may be built as-new, without utilizing prior-used conveyor infrastructure.

In some embodiments, the conveyor system 20 can include a plurality of carriers 28 (hundreds, or even thousands), and all of the carriers in the system can be ACCs 28 so that each and every carrier within the system is operable to drive itself along the conveyor rail 24. The fixed infrastructure of rails extending along the conveyor path can be limited to just the single conveyor rail 24, which is a passive rail merely supporting the ACCs 28 to define the path. The conveyor rail 24 can be a simple structural element such as a channel or beam, for example, an I-beam. The rail 24 is not equipped to transmit drive forces or the energy for driving the ACCs 28 during conveyance. Rather, each ACC 28 moves itself along the conveyor rail 24 by supplying electrical energy from the on-board batteries to a drive unit including one or more motors coupled to one or more wheels of the self-driving trolley 32. Thus, each self-driving trolley 32 has at least one drive wheel as discussed further below. In addition to a drive wheel(s), each self-driving trolley 32 may also have one or more non-driven or "free" wheels, which may be referred to as rollers or idle rollers. Each self-driving trolley 32 can include a single motor or multiple motors. The self-driving trolleys 32 may be devoid of any steering mechanism (e.g., steerable wheels or differential left-right drive) as the conveyor rail 24 defines the travel path(s).

The self-driving trolley 32 and associated hardware are described in further detail with respect to FIGS. 2 and 4-9. The trolley 32 is adapted with one or more rollers 56 coupled to a trolley frame 200 in addition to a motor frame 202 supporting a motor 204 (e.g., electric motor, particularly an AC permanent magnet motor). An inverter 206 on the ACC 28 (e.g., positioned in the enclosure 52 with the batteries 50) operates to convert DC battery power into an AC power supply for the motor 204. A motor power cable 120 (FIG. 4) provides power (e.g., three-phase AC) from the inverter 206 to the motor 204. The motor power cable 120 can extend continuously between the inverter 206 and the motor 204, penetrating the wall of the enclosure 52, or alternately, can include a quick-disconnect (e.g., plug-in socket) feature at the enclosure 52. Additional electrical connections between the electronics in the enclosure 52 and the motor 204 (e.g., the inverter 206 to an encoder, a brake, and a thermistor of the motor 204) are established by additional wires routed through a flexible conduit 124 (FIG. 2) that extends between the enclosure 52 and the self-driving trolley 32, particularly the trolley frame 200. The motor 204 is manufactured as part of a drive unit 208 (FIG. 8) that includes not only the motor 204, but also an integral gearbox 212 and a drive wheel 216. The drive wheel 216 is separate from the rollers 56. The gearbox 212 reduces the output speed and increases torque from the motor 204. The drive wheel 216, an outer surface of which is of urethane construction in some constructions, may be positioned at least partially between the motor 204 and the gearbox 212. The drive wheel 216 can have an outer diameter larger than one or both of the motor 204 and the gearbox 212.

Figure 6:
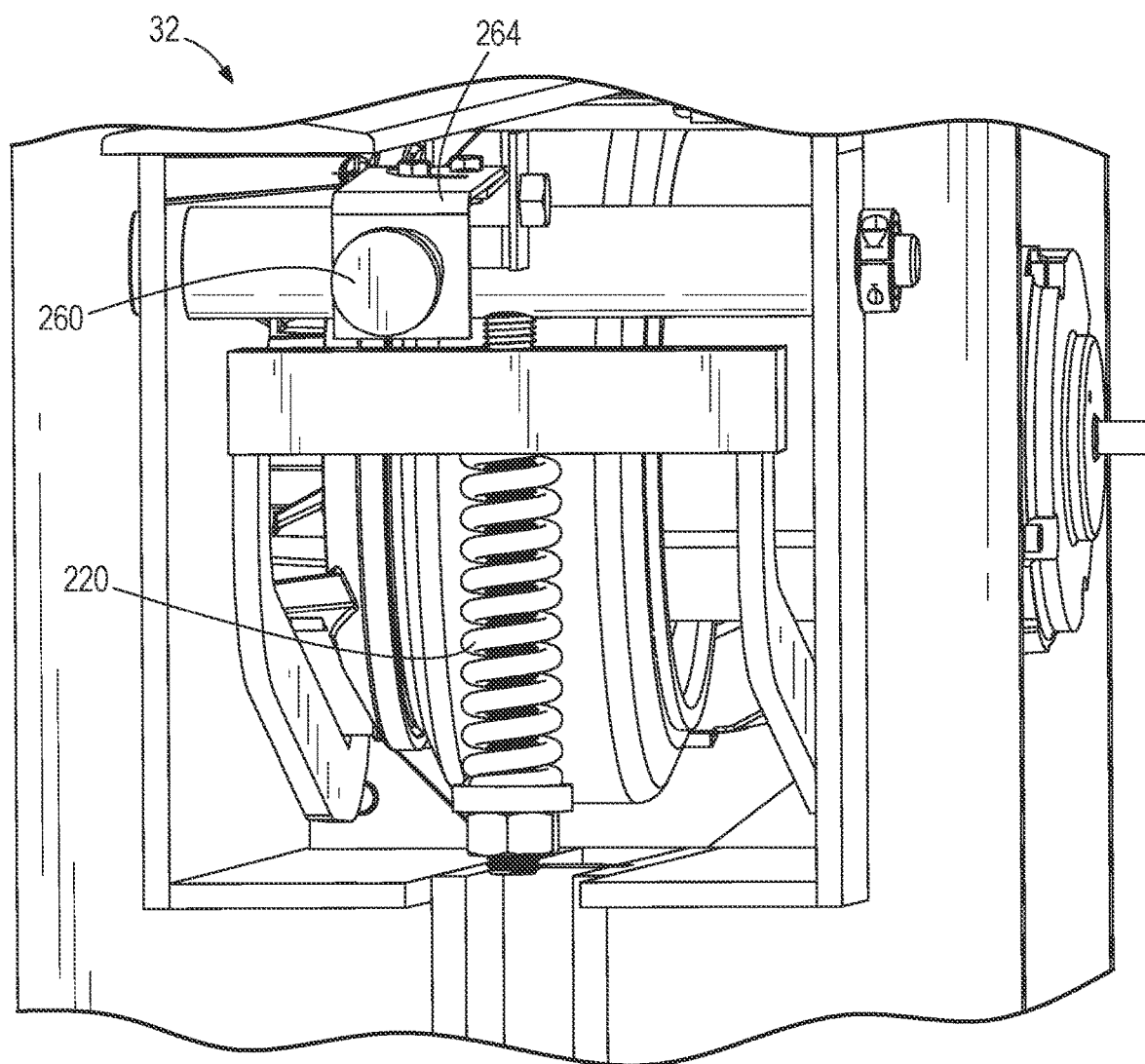
FIG. 6 is a front view of the self-driving trolley, including a sensor configured to monitor the surroundings in front of the automated conveyor carrier.
Figure 7:
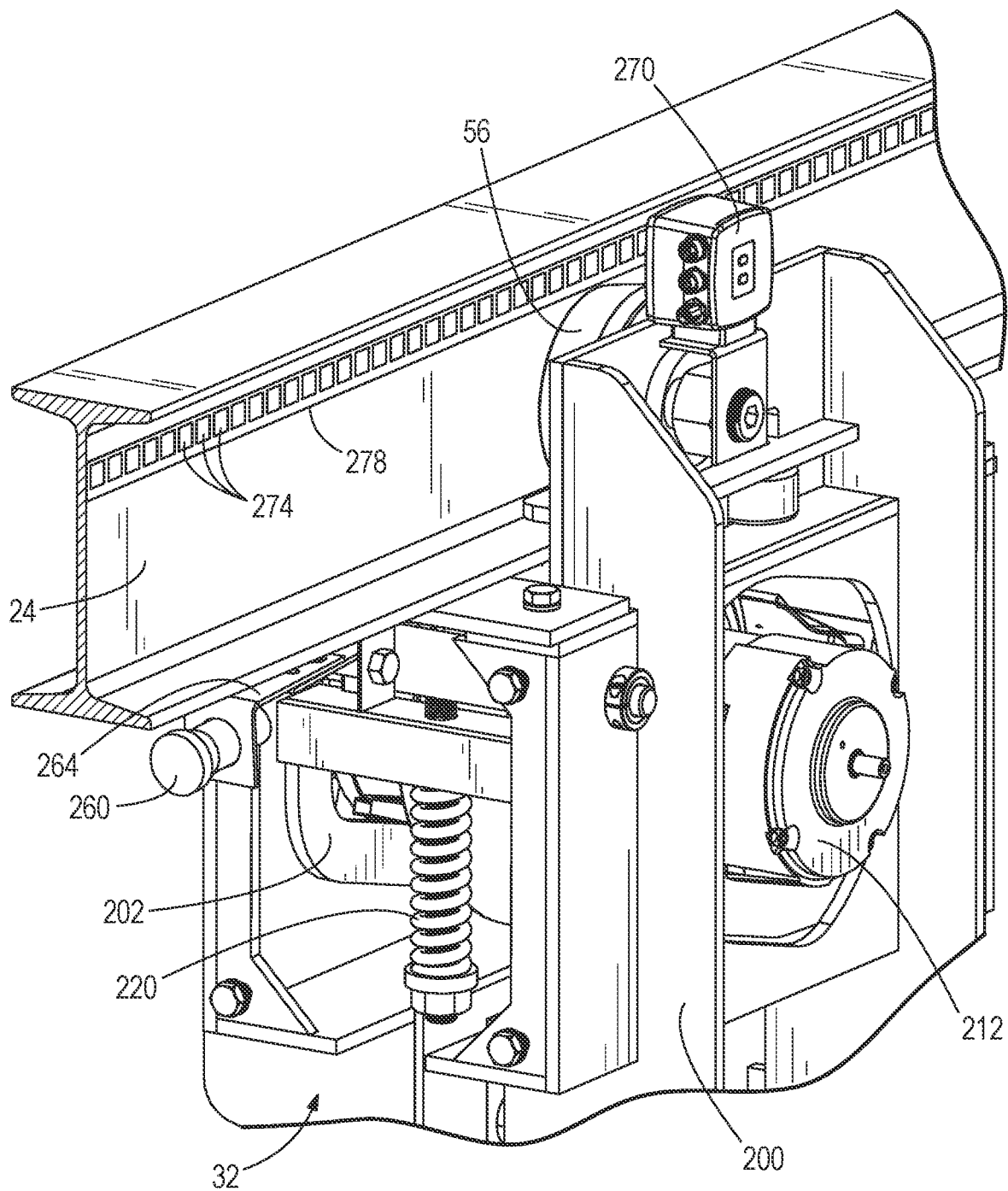
FIG. 7 is another perspective view of the self-driving trolley.
Figure 8:
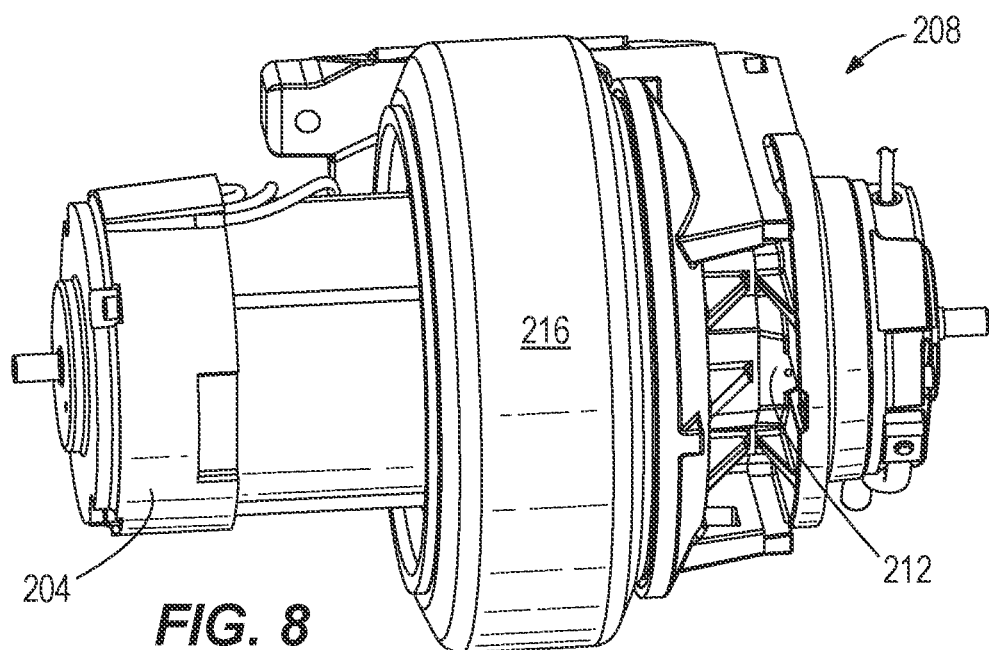
FIG. 8 is a perspective view of a drive unit of the self-driving trolley.
Figure 9:
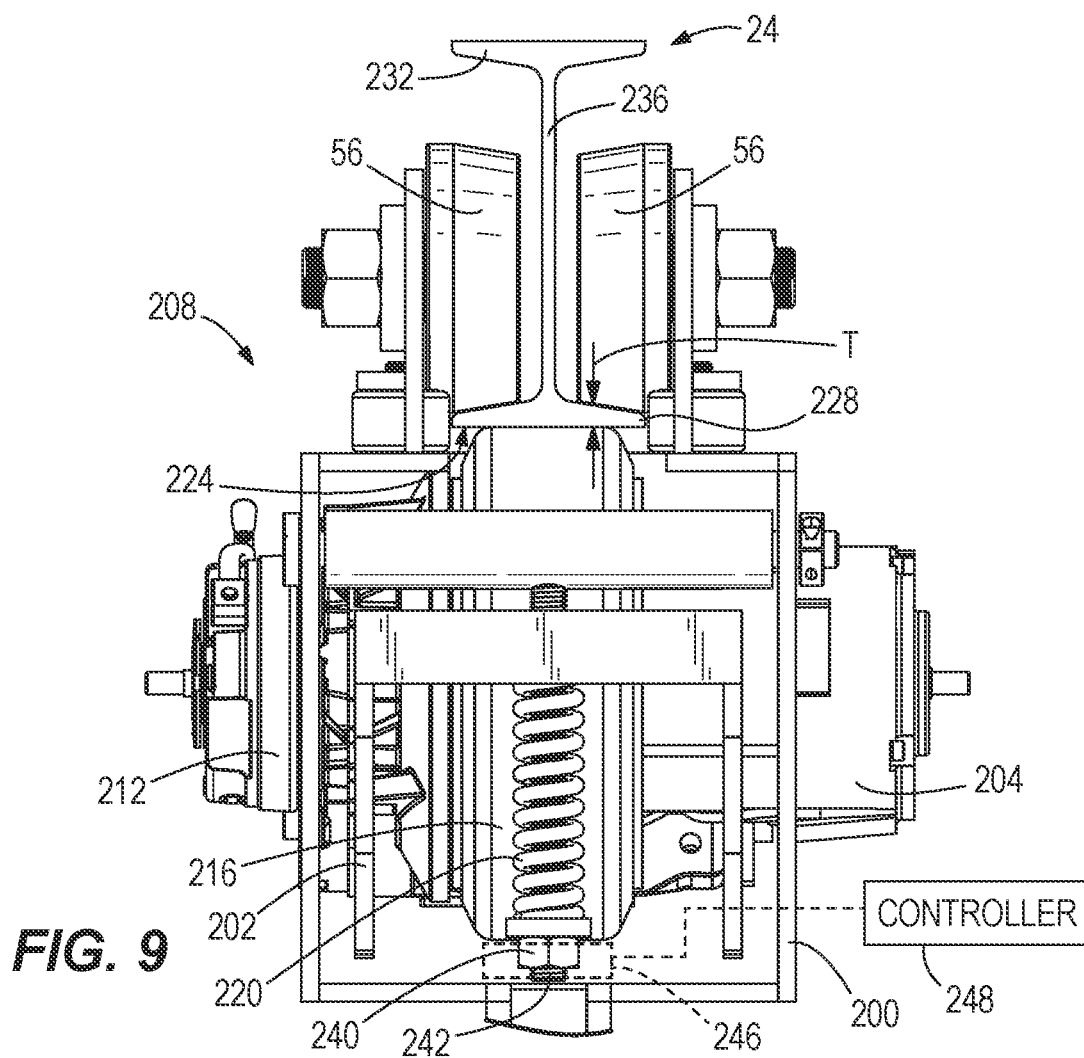
FIG. 9 is a cross-section view illustrating a pre-tensioning of the motor unit against a rail of the conveyor system.
Figure 13:
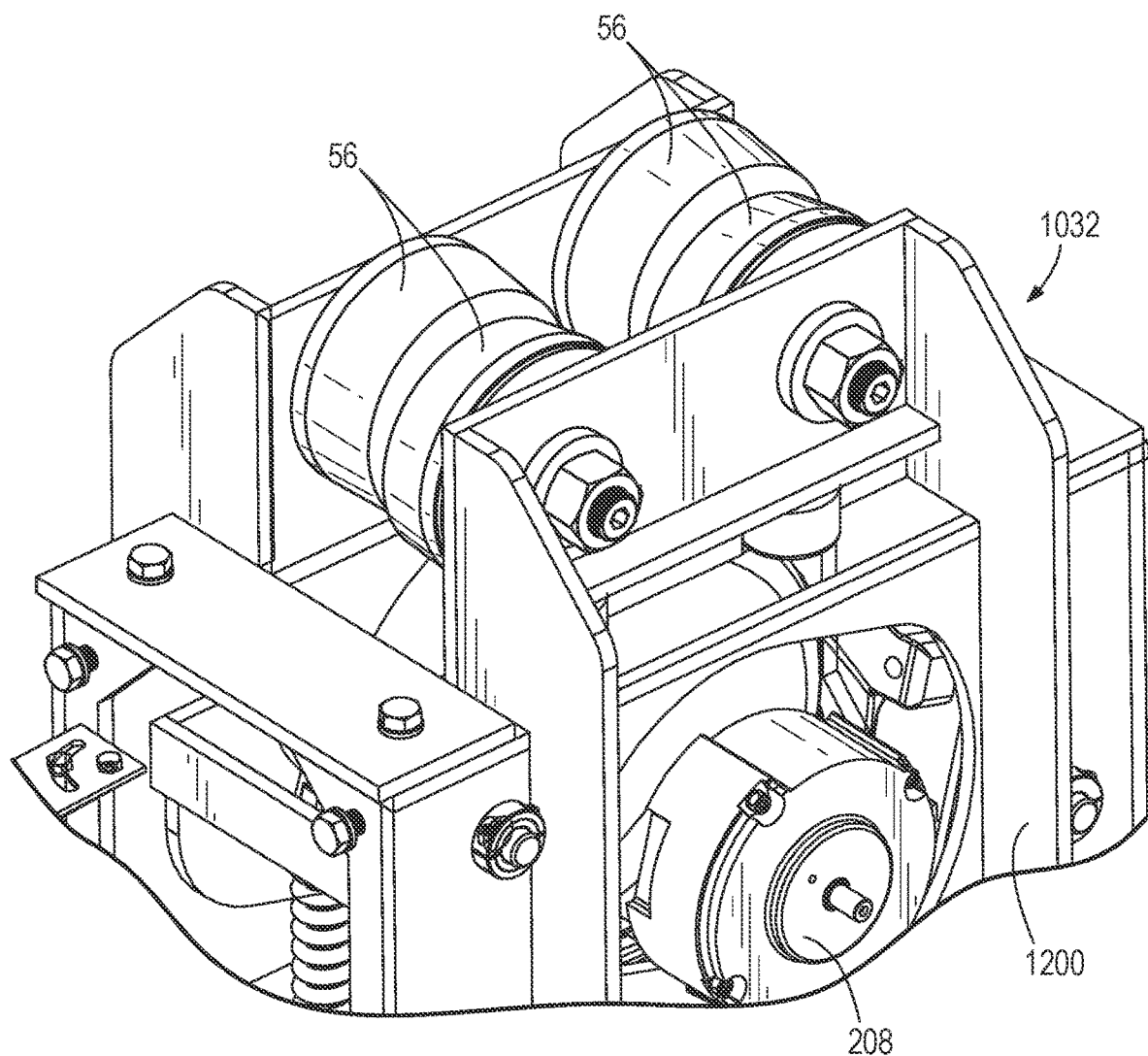
FIG. 13 is a perspective view of a self-driving trolley according to an alternate construction.

As shown in FIGS. 6, 7, and 9, one or more springs 220 are coupled between the trolley frame 200 and the motor frame 202 (to which the drive unit 208 is fixed) to bias the drive unit 208 toward the rail 24 in a direction perpendicular to the lengthwise conveyance direction defined by the rail 24. The springs 220 operate to exert a bias force that increases traction between the drive wheel 216 and the corresponding contact surface 224 of the rail 24. The contact surface 224 is provided as a lower or bottom surface of a lower or bottom web 228 of the rail 24. As shown, with the I-beam cross-section of the rail 24, the web 228 is a bottom horizontal web of the rail 24. In addition to the bottom horizontal web 228, the rail 24 further includes an upper or top web 232 (e.g., horizontal top web that is parallel to and spaced from the web 228) and an additional web 236 (e.g., central vertical web perpendicular to webs 228, 232) interconnecting the bottom and top webs 228, 232. The bottom web 228 is the web nearest the conveyed work pieces 48, and the contact surface 224 faces the work pieces 48 and the ground (earth) in the illustrated construction. As illustrated, one coil spring 220 biases the drive wheel 216 and presses it onto the rail contact surface 224, but other numbers, types, and arrangements of springs are also contemplated, and these parameters may vary depending on the type of rail, the intended loads to be carried by the ACC 28, among other factors. The above-described arrangement results in the bottom web 228 being trapped or pinched between the drive wheel 216 and at least one roller 56 on an upper side of the bottom web 228 (e.g., exactly one roller 56 per side of the central vertical web 236, with these two rollers having a common rotational axis). FIG. 13 illustrates an alternate construction in which a self-driving trolley 1032 includes a trolley frame 1200 supporting multiple pairs of rollers 56 defining respective rotational axes that are longitudinally spaced from each other.

The total traction between the drive wheel 216 and the contact surface 224 is related to the ACC's 28 ultimate load-carrying capacity. For example, the available output capacity of the motor 204 (and with it the gearbox 212) alone may not guarantee the ability of the ACC 28 to tow a given load along the conveyor rail 24, if there is insufficient traction for the drive forces to be transmitted between the surface of the drive wheel 216 and the contact surface 224. Further, total traction is a function of the normal force between the drive wheel 216 and the contact surface 224, which in turn, is a function of the compression of the spring(s) 220. In order to alter the available traction of the self-driving trolley 32, an adjustment member 240 is operable to vary the loading of the spring(s) 220. The adjustment member 240 as shown includes a nut threaded to a shaft 242 that extends between respective portions of the trolley frame 200 and the motor frame 202 that cooperatively define a packaging space for the spring(s) 220. As such, tightening of the nut 240 on the shaft 242 further compresses the spring(s) 220 to further load the drive wheel 216 against the contact surface 224 of the rail 24. On the contrary, loosening the nut 240 on the shaft 242 reduces spring compression to reduce loading of the drive wheel 216 so that slippage will occur at relatively lower loads. In some constructions, the adjustment member 240 is merely manually adjustable by a technician (e.g., with a wrench during stoppage or deactivation of the conveyor system 20), while in other constructions, the adjustment member 240 is remotely and/or automatically adjustable to vary the traction of the self-driving trolley 32. In one such construction, an actuator 246 such as an electric motor adapted to turn the adjustment member 240 is provided and connected to receive command signals from a controller 248. The controller 248 can be a localized, or "on-board", controller dedicated for this purpose, or may incorporate additional functions as well. As illustrated, each controller 248 is an on-board controller of a particular ACC 28 dedicated to driving that ACC. The controller 248 comprises a variable frequency drive (VFD) including the inverter 206 and a processor 312 (e.g., embedded microprocessor). The controllers 248 of the various ACCs 28 within the conveyor system 20 form one part of an overall control system for operating the ACCs 28. The controller 248 can contain programmable, executable instructions for commanding the actuator 246 to adjust (up or down) the loading of the drive wheel 216 so that overall traction is increased or decreased. The instructions can allow different sections of the conveyor system 20 have different traction conditions effecting different load-carrying capacities. In other words, different sections of the conveyor system 20 will have different slip limits. Furthermore, this functionality need not be limited to designated or fixed sections of the conveyor system 20, and may alternately or additionally be manipulated conditionally on one or more parameters (e.g., "on the fly").

Although the above description details the ability of the adjustment member 240 to vary the slip limit, another manner of varying the slip limit is to vary a thickness T of the bottom web 228 that is pinched between the upper rollers 56 and the drive wheel 216 as this will also have the effect of further loading the spring(s) 220. Designated sections of the rail 24 can be intentionally thickened or built-up by adding one or more thin strips of sheet material (e.g., adhesive-backed sheet metal). Additionally or alternatively, designated sections of the rail 24 can be worked by subtractive methods (e.g., grinding, sanding, milling, etc.) to reduce the web thickness T. In some constructions, one or more surfaces of the web 228 engaged by the upper rollers 56 or the drive wheel 216 can be intentionally modified to provide an enhanced or reduced coefficient of friction. For example, designated sections (whether or not the web thickness T is also altered) along the rail 24 may be pressed, machined, etc. to impart texture or roughness exceeding a nominal texture or roughness of the rail 24. Such sections are then subject to increased load-carrying capacity and have a higher slip limit. Alternately or additionally, designated sections along the rail 24 may be polished or have a friction-reducing agent applied in order to locally decrease the load-carrying capacity and induce slippage at lower limits. Any one or more of these steps can be carried out as part of a method of retrofitting an existing conveyor system (without powered carriers) into the conveyor system 20 designed for use with the ACCs 28, or alternately, for an original installation of the conveyor system 20.

Although additional traction and improved load-carrying capacity of the ACC 28 may be highly desirable (e.g., as a means to avoid other costly solutions such as upsizing components and/or the use of more exotic materials), there are cases in which lower limit slippage between the drive wheel 216 and the contact surface 224 is desirable. For example, in a given conveyor installation in an industrial space, part of the industrial space may be accessible by other equipment and/or human workers. Such factors may introduce the possibility of collision of some part of the ACC 28, or its payload. Absent other measures, there may also be a remote possibility of collision between a consecutive pair of the ACCs 28 on the rail 24. In any collision circumstance, an abundance of traction between the ACC 28 and the rail 24 is not of benefit, but rather introduces greater potential for harm to equipment and/or personnel. Thus, certain areas may be designated as areas of potential collision or "safety zones" along the rail 24, and these safety zones may have a lesser amount of available traction and thus lower slip limits and lower load-carrying capacity than other zones. As such, in the event of collision, a driving ACC 28 may merely start slipping in place along the rail 24 rather than pulling itself further along. Of course, the conveyor system 20 can also include a number of integrated anti-collision means that are configured to avoid collisions in the first place (e.g., by detection with a sensor and signaling the stoppage of the ACC 28). In some constructions, the ACC 28 may, through operation of the controller 248, identify entry into a safety zone and automatically respond by transforming into a reduced-traction configuration. This can be accomplished through automatic manipulation of the adjustment member 240. In some aspects, the invention includes setting the pressing force on the drive wheel 216 in accordance with the load carried by the ACC 28, such as at the time of setup or loading, so that the resulting traction is only slightly above the minimum amount of required traction to move the load carried (e.g., not more than 10 percent above minimum, or not more than 20 percent above minimum). In some cases, the ACCs 28 include load sensors that automatically detect the load applied, and the controller 248 operates to set the pressing force on the drive wheel 216 automatically in accordance with the measured load.

Figure 11:
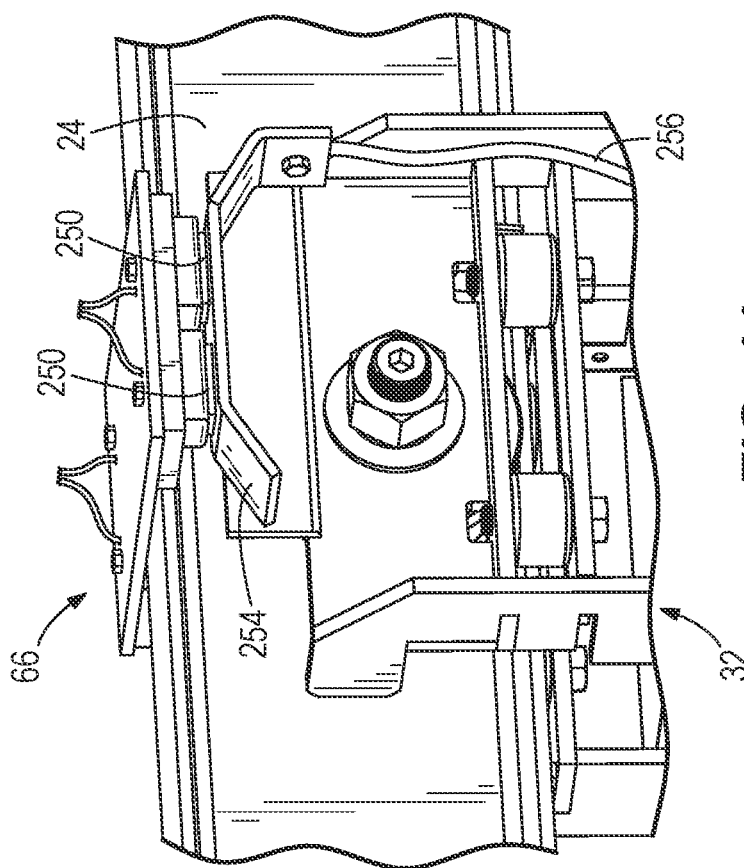
FIG. 11 is a perspective view from alongside the charging station, as it accommodates the self-driving trolley.
Figure 10:
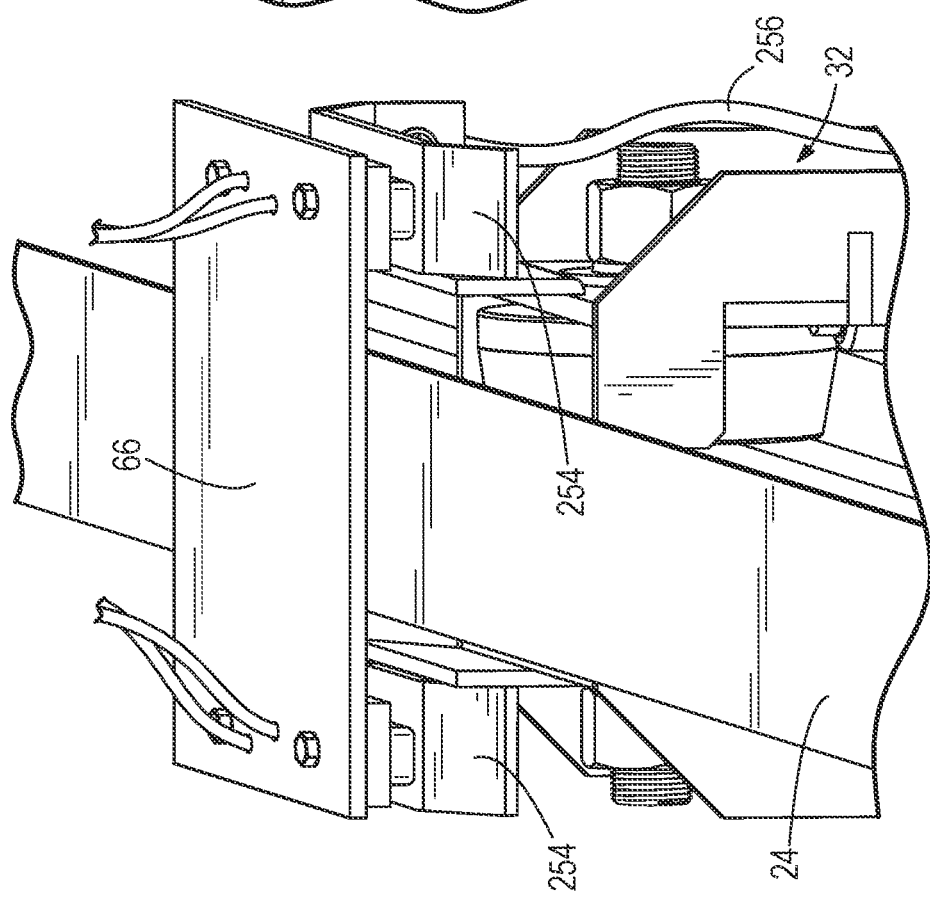
FIG. 10 is a perspective view from above the charging station, as it accommodates the self-driving trolley.

For periodic charging of the batteries 50 of the ACC 28, there are one or multiple chargers 66 positioned adjacent the rail 24. For example, each charger 66, an example of which is illustrated in FIGS. 10 and 11, can be positioned above the rail 24. The charger 66 can be fixed with respect to the rail 24. In other constructions, the charger 66 can be adjustably positioned, or adapted for movement between different locations along the rail 24, for example during operation of the conveyor system 20 in response to monitored location-based charging needs. The charger 66 includes a plurality of charging contacts 250 in electrical communication with a power source, such as grid power supplied to the facility housing the conveyor system 20. The charging contacts 250 can be spaced across the rail 24 such that positive contact(s) 250 are on one side of the rail 24 and negative contact(s) 250 are on the opposite side of the rail 24. Thus, in plan view, the charging contacts 250 may be symmetrically positioned about the rail 24. The charger 66 may also include additional electronics adapted to increase voltage and/or condition the charging current supplied to the charging contacts 250 when charging the batteries 50. The charging contacts 250 can be constructed of a metal of high electrical conductivity (e.g., solid copper or copper laminations). The charging contacts 250 include at least one positive contact and at least one negative contact, and in some constructions multiple pairs of each. In order to interface with the charging contacts 250 of the charger 66, the ACC 28 includes mating charging contacts 254 (e.g., plates, bars, etc.). As illustrated, the charging contacts 254 are provided on the self-driving trolley 32 to be on opposite lateral sides of the rail 24. The point of contact between the charging contacts 250, 254 can be within the height of the rail 24 in side view. As such, the point of contact between the charging contacts 250, 254 can be below the top surface of the rail 24. The charging contacts 250, 254 are adapted to automatically couple and establish electrical connection automatically by bringing the trolley 32 having the charging contacts 254 into a position along the rail 24 that is in register with the charger 66. The fixed charging contacts 250 of the charger 66 and/or the ACC charging contacts 254 can be resiliently-mounted (e.g., with one or more springs) such that connection into a charging position includes deflecting at least one positive and at least one negative charging contact 250, 254 while driving the trolley 32 along the rail 24. Charging contacts can be provided on the self-driving trolley 32 and/or a free-rolling trolley 36. As illustrated, an upper side of each of the ACC charging contacts 254 is convex (e.g., having a flat horizontal center section with downwardly-angled leading and trailing ends). Respective positive and negative battery cables 256 extend between the batteries 50 in the enclosure 52 and the ACC charging contacts 254. The cables 256 can penetrate the enclosure 52, or alternately, can include a quick-disconnect (e.g., plug-in socket) feature at the enclosure 52. The charger 66 can be positioned strategically at a dwell location where the ACC 28 is naturally stopped for at least a brief period of time according to the regular process served by the conveyor system 20. For example, the charger 66 can be positioned at a paint cure station, a cooling area, a parts loading station, a parts unloading station, etc.

The conveyor system 20 comprises a control system including the dedicated controllers 248 and a master land-based processing unit (LBPU) 290 as shown in FIG. 12. The master LBPU 290 contains the instructions for the conveyor system 20 as a whole, including all the on-line ACCs 28, and the master LBPU 290 can send updated instructions to any one or more of the ACCs 28 at any given time. The master LBPU 290 may provide periodic or continuous instruction to each of the on-line ACCs 28. In some constructions, the master LBPU 290 may provide no instructions to the ACCs 28 during normal running after start-up. However, the master LBPU 290 maintains master control authority over all the dedicated controllers 248. The LBPU 290 can communicate wirelessly with each of the ACCs 28, either directly device-to-device (e.g., over a Wi-Fi or other wireless network 294) or indirectly, for example if the network 294 includes a plurality of distributed wireless hubs, each provided as a wireless "access point" or "router", to effectively cover the full area of the conveyor system 20 by the network 294. Each ACC 28 includes a wireless communication module 300 communicatively coupled to the network 294 and provided as part of the on-board controller 248. The wireless communication module 300 enables establishing wireless communication between the master LBPU 290 and the controller 248. In some constructions, the wireless communication module 300 comprises a Wi-Fi module and/or a Bluetooth® module. The wireless communication module 300 can comprise a circuit equipped with an antenna, and optionally a transmitter, thus forming a transceiver. In some constructions, the network 294 comprises a mesh network in which some or all of the ACCs 28 communicate directly to each other via the respective wireless communication modules 300.

Each ACC 28 can be equipped with a battery monitoring/sleep mode module 316 coupled to monitor the condition (e.g., voltage) of the on-board batteries 50. For example, the battery monitoring/sleep mode module 316 includes a monitoring circuit. Maintaining all the ACCs 28 on the rail 24 in operational status is of critical importance as the loss of one ACC 28 will hold up the progress of the other ACCs 28 and stop the conveyor system 20 from running further. In order to maintain ACCs 28 in operational status, each controller 248 therein can be selectively put into a sleep mode by the battery monitoring/sleep mode module 316. In the sleep mode, power draw by the controller 248 is reduced below operational level and may be reduced to zero so as to avoid battery rundown during idle times, since the controller 248 including the inverter 206 may consume substantial power even when not actively driving the ACC 28 along the rail 24. The sleep mode is separate from an idle mode in which the ACC 28 is stopped and all ACC electronics are active and ready for running. For example, if there is a temporary (e.g., planned or unplanned) stoppage of the conveyor system 20 where each ACC 28 must remain in its current position on the rail 24 until such time as the conveyor system 20 can be restarted, the ACCs 28 may be triggered automatically or deliberately to enter the sleep mode. The sleep mode can be triggered by an idle sensor (e.g., accelerometer, speed sensor, or position sensor) which can be any type of movement sensor operable to detect lack of movement of the ACC 28. The idle sensor can work in conjunction with a timer to determine a time duration of idleness, whether expected or unexpected. A fixed or variable time threshold can be used for determining when the ACC 28 is put into its sleep mode. The sleep mode can be commanded by the on-board controller 248 and reported to the master LBPU 290, or can be commanded by the master LBPU 290. Alternately or as an additional option, sleep mode can be triggered by a manual physical control (switch, dial, button) accessible to a service operator (e.g., on the exterior of the enclosure 52). When sleep mode is triggered by a signal sent out from the master LBPU 290, this can be in response to a preprogrammed routine of the master LBPU 290 or in response to a human operator's direct request made via the master LBPU 290. In the sleep mode, the battery monitoring/sleep mode module 316 remains active so that it continues to monitor for a wake signal (e.g., from the master LBPU 290) so that the controller 248 can be relatively instantly awakened for further operation. The battery monitoring/sleep mode module 316 can be powered by the batteries 50, and may in some constructions be the only device powered by the batteries 50 when the ACC's on-board controller 248 is put into sleep mode. The battery monitoring/sleep mode module 316 can be a very low power device that can run off the batteries 50 for multiple days without adversely affecting the battery state of charge. In some constructions, the battery monitoring/sleep mode module 316, in sleep mode and/or normal running mode, transmits data regarding the battery condition to the master LBPU 290. With the battery condition data, the master LBPU 290 can issue a master alarm to warn plant personnel in response to detection of a low battery state of charge on one or more ACCs 28 (e.g., below a predetermined fixed or variable threshold). Such an alarm can allow plant personnel to take action to prevent total battery discharge for a given ACC 28.

The battery monitoring/sleep mode module 316 can comprise a wireless communication module (e.g., Wi-Fi, Bluetooth®, other wireless radio frequency communication band such as 900 MHz, or other UHF band, etc.) and a processor. The processor can include the circuit for monitoring the condition of the on-board batteries 50. As shown in FIG. 12, the battery monitoring/sleep mode module 316 can be connected (e.g., via wires) to the batteries 50 to monitor battery condition, and can be further connected (e.g., via wires) to a relay 320. The batteries 50 can be monitored individually or as a unit. The battery monitoring/sleep mode module 316 selectively switches the relay 320 on and off to control whether or not power is connected from the batteries 50 to the on-board controller 248. The battery monitoring/sleep mode modules 316 may be connected on the same network 294 that provides the drive control to the ACCs 28 (e.g., when drive control and sleep control are provided over Wi-Fi channels), or may be connected to an alternate or sub-network (e.g., when the drive control is provided via Wi-Fi and the sleep control is provided via separate UHF band) that also includes the master LBPU 290.

Further, each of the local controllers 248 of the respective ACCs 28 is programmed to carry out independent power level management for its own on-board batteries 50. Each ACC 28 controller 248 may continuously monitor its battery level and current work cycle instructions (i.e., predicted power requirements based on duration of work cycle, travel distance, speed and acceleration profiles, etc.) to predictively identify any set of circumstances that could lead to the ACC 28 having a battery level that would leave it unable to complete its work cycle and stranded on the rail 24 away from a charger 66. As such, the controllers 248 can be programmed with an adaptive routine or algorithm that determines a low power status (in which the work cycle of the ACC 28 may be put in jeopardy) that is based only in part on the power level of the on-board batteries 50. The lower power status is further based in part on the current location of the respective ACC 28 along the rail 24 and/or a weight of the respective load 100 suspended therefrom. In the event that the ACC 28 determines that there is a threat to the ability to complete the work cycle (i.e., predictively, with ample lead time to take countermeasures), one or more actions may be taken to alleviate the threat. One such action is to communicate to the master LBPU 290 with a system warning, which may be monitored by a human supervisor. The warning can include an identification of the exact identity and/or location of the ACC 28 that is threatened. The ACC 28 can also include an externally observable (e.g., visible light or audible alarm) indicator that is triggered to illuminate/sound when the threat is identified. However, more than calling attention to the problem, the ACC 28 may also be programmed to automatically execute a failsafe action, such as automatically adapting its operation in one or more ways, e.g., re-routing toward a service and/or charging location, reverting automatically to a power-saving mode of operation, etc. For this purpose, the rail 24 can include a series of exits or pull-outs whereby ACCs 28 can seamlessly exit the active production line in the event of a threat. If adequately remedied, the ACCs 28 can return automatically to the active production line. The above mentioned indicator may also be used in times other than battery level threats. For example, one or more indicators can display a current battery charge level, or overall battery health status (e.g., a series of lights of one or multiple colors, alphanumeric and/or symbolic indicia, etc.). The threat identification of the ACC 28 can operate in conjunction with a reprogrammable minimum battery charge level, which corresponds to the minimum battery charge level required to reach the next charging station or complete the current work cycle (e.g., plus a suitable safety factor). When changes occur to the work cycle, or the ACC 28 is reassigned to another work cycle, the battery monitoring system is reprogrammed to the new parameters (e.g., automatically, for example with adaptive learning) to ensure proper performance.

A power-saving mode may be a pre-programmed mode of operation that has one or more alternate sets of instructions for operating the motor 204, differently than a primary or normal operating mode. The alternate sets of instructions can include lower acceleration rates and/or lower fixed speeds over one or more sections of the conveyor path. The affected ACC 28 can also communicate with the master LBPU 290 and/or nearby ACCs 28 in the event that the affected ACC 28 going into the power-saving mode will necessarily affect the other ACCs 28 ability to conduct their normal programmed work cycle. In some constructions, a transition of an affected ACC 28 into power-saving mode automatically results (e.g., by direct communication between ACCs 28, or via the master LBPU 290) in transitioning one or more additional ACCs 28, otherwise unaffected, into an alternate mode of operation, which may in some circumstances be a sympathetic transition into power-saving mode. Once the affected ACC 28 is properly managed (to receive additional charge, or be transitioned out of the main conveyor path through the work stations), the ACCs 28 may revert to normal operation, and this may be carried out by automatically sensing corrective action to the affected ACC 28, or through a signal from the master LBPU 290, which signal can be automatically or manually (operator) generated.

Although the conveyor system 20 can include means for automatically monitoring ACC battery charge levels and automatically charging the batteries 50 to prevent rundown to a level that jeopardizes the ACC's ability to complete a given task, unforeseen malfunction or simply aging of the batteries 50 may result in the periodic need to replace the batteries 50 within the ACC 28. As mentioned above, each ACC enclosure 52 can contain multiple batteries 50, each of which can weigh in excess of 20 lbs or 30 lbs (e.g., 50 lbs.). Thus, a significant amount of work is involved in removing and replacing batteries 50. In some constructions, a maintenance platform is constructed at or elevated to the height of the enclosure 52 to facilitate a battery swapping operation. Each battery 50, or the batteries 50 collectively as a battery pack, can have removable connectors that are disengaged to electrically and physically separate the batteries 50 from the other electronics on the ACC 28. In order to physically remove the batteries 50 from the enclosure 52, all batteries 50 can rest upon a battery tray that slides into and out of the enclosure 52 when the enclosure is opened. With or without a sliding tray, the batteries 50 can be mounted on a surface with a low friction coating (e.g., UHMW polyethylene or Teflon™) to facilitate easy sliding of the batteries 50 from the enclosure 52 to an external support structure or shelf. In some constructions, the batteries 50, individually or as a pack, are electrically coupled to the ACC electronics automatically upon physical installation into place within the enclosure 52. For example, the batteries 50 can have posts or other attached terminal structures that plug into mating structures, for example sockets, of the enclosure 52 so that installation of the batteries 50 into the enclosure 52 and attachment with the battery-powered electronics are simultaneously accomplished in a single step.

In another construction, an entire replacement enclosure 52 (e.g., having the same construction according to the above description) may be coupled to the ACC 28 after removal of the original or first enclosure 52. As such, the entire battery pack of the first enclosure 52 is replaced with a fresh, charged battery pack of the replacement enclosure 52. All new electronics of the replacement enclosure 52 are therefore associated with the ACC 28 and its motor 204 after removal of the first enclosure 52 and its electronics. The electronics refer to, for example, the controller 248 with the inverter 206 and the wireless communication module 300, along with the battery monitoring/sleep mode module 316, and relay 320, among other things. Electrical and physical disconnection of the first enclosure 52 can take place on the exterior of the first enclosure 52, such that it need not be opened during enclosure replacement, and individual components are not individually replaced, swapped, connected/disconnected. The same is true of the connection of the replacement enclosure 52.

In yet another construction, an alternate or secondary enclosure 52', smaller than the first enclosure 52, can be coupled to the ACC 28 (e.g., with magnets, straps, threaded fasteners or any other suitable means or combinations thereof) to power the motor 204 in the event of insufficient power of the battery pack in the first enclosure 52 or other malfunction therein. An example is shown in broken lines of FIG. 4. The secondary enclosure 52' can be a fully functional replacement (e.g., duplicate controller 248) for the first enclosure 52, without having the full battery capacity of the battery pack of the first enclosure 52. The secondary enclosure 52' can thus be significantly smaller, lighter, and easier to handle during an unexpected service operation. The secondary enclosure 52' can be designed as a rescue pack to immediately mobilize an otherwise stranded ACC 28 so that it can be driven under its own power to a maintenance location off the main process line. For this purpose, the battery 50' of the secondary enclosure 52' can have the same voltage rating as the battery pack of the first enclosure 52 while having significantly less capacity, which may be a comparison of amp-hour ratings, according to a common established capacity rating methodology. The battery 50' may also have a different, optionally more advanced, battery cell chemistry as compared to the batteries 50 (e.g., lithium-ion vs. lead-acid). In some constructions, the secondary enclosure 52' including all its contents can weigh less than half that of the first enclosure 52 including all its contents, or even less than 25 percent. In some constructions, the first enclosure 52 including all its contents weighs 400 lbs. or more, and the secondary enclosure 52' including all its contents weighs less than 100 lbs. In some constructions, the secondary enclosure 52' including all its contents weighs less than 50 lbs. Similar comparisons and examples may be true of a direct comparison of the batteries 50 of the battery pack of the first enclosure 52 and the battery 50' of the secondary enclosure 52'. In some constructions, the secondary enclosure 52' includes one and only one battery 50'. In some constructions, the secondary enclosure 52' is utilized as a handheld rescue pack that can be lifted and coupled to the ACC 28 by a human service worker, without requiring hoisting of the rescue pack with a crane, lift, or other equipment, thus further limiting the potential down time for administering the secondary enclosure 52'.

With respect to FIGS. 6 and 7, it is illustrated that the ACC 28 includes at least one sensor 260 configured to monitor the surroundings adjacent the ACC 28. The illustrated sensor 260 is positioned on the self-driving trolley 32 and aimed in a forward direction, assuming the self-driving trolley 32 operates to pull the remaining free-rolling trolleys 36. The sensor 260 can be aimed forward as viewed in plan view, and may be aimed with a downward angle (e.g., 30 to 60 degrees downward from the direction of extension of the rail 24) as viewed from the side. The sensor 260 is supported by a bracket 264 on the trolley frame 200. In some constructions, the sensor 260 has a range of available movement up/down, side-to-side, or a combination thereof. Thus, the sensor 260 can be adjusted, either manually or automatically (e.g., with one or more remotely-operable actuators). The sensor 260 can be an ultrasonic proximity detector operable to emit ultrasonic radiation and detect reflected ultrasonic radiation from the immediate surroundings. The sensor 260 may be operable to detect unexpected foreign objects or a preceding ACC 28 in an unexpected proximity to the ACC 28. The sensor 260 communicates output signals to the controller 248, which receives and interprets the output signals in order to make determinations about whether or not to modify or abort the forward movement of the ACC 28. The controller 248, on the basis of the signals output from the sensor 260, can also detect and distinguish a human form from other machinery, such as an ACC 28 or a work piece 48. In some constructions, the sensor 260 is a camera, such as an optical or infrared camera. In some constructions, the sensor 260 is a laser or radar sensor. It is also contemplated that the ACC 28 can include multiple sensors operable to monitor the proximity, and these can include multiple sensors of similar type, or a mixed-type sensor array. It is also noted that sensors can be provided on more than one side of the ACC 28, either on the self-driving trolley 32, or on other parts of the ACC 28.

Figure 4:
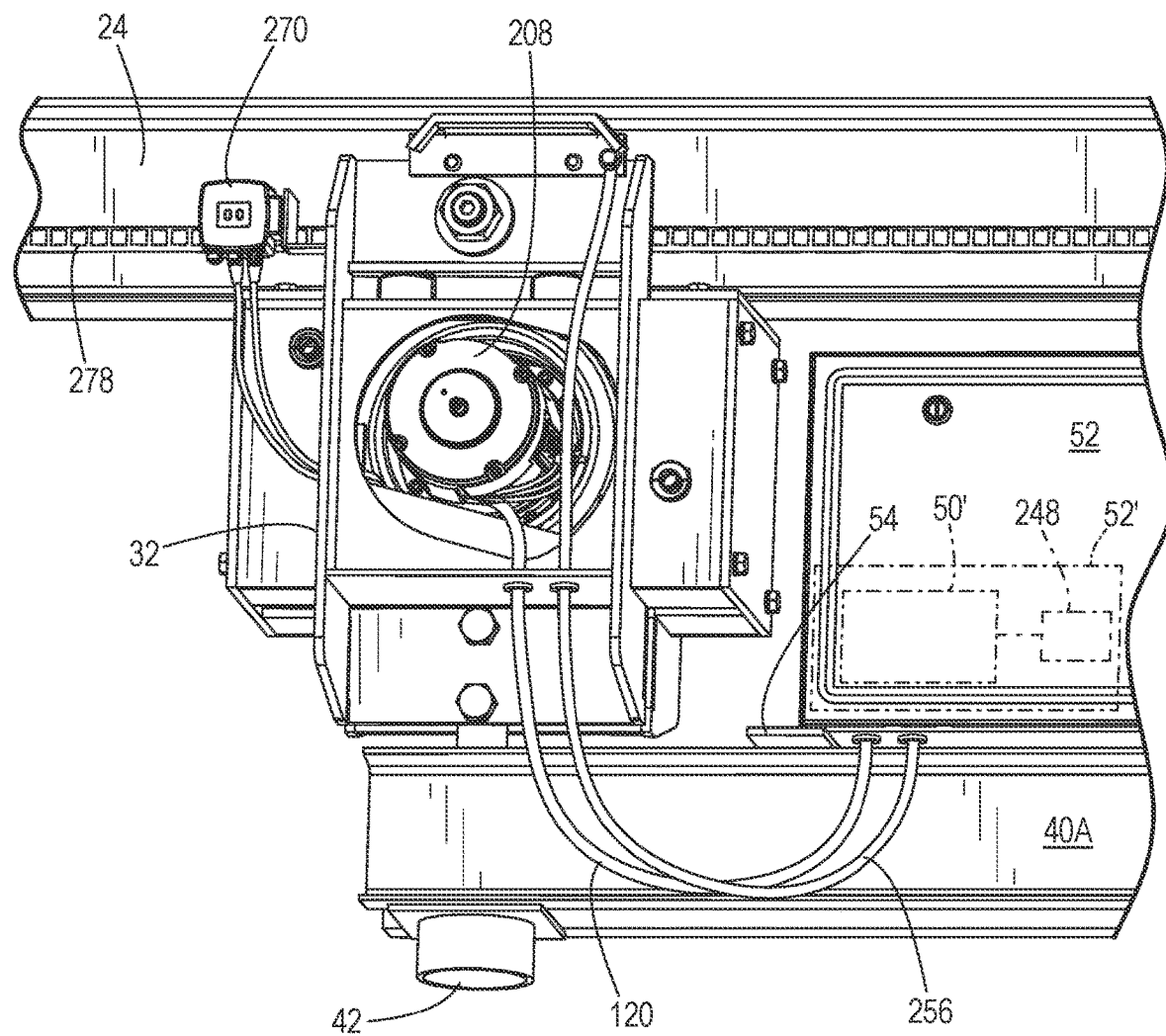
FIG. 4 is a perspective view of a self-driving trolley of the automated conveyor carrier driven portion of FIG. 2.
Figure 5:
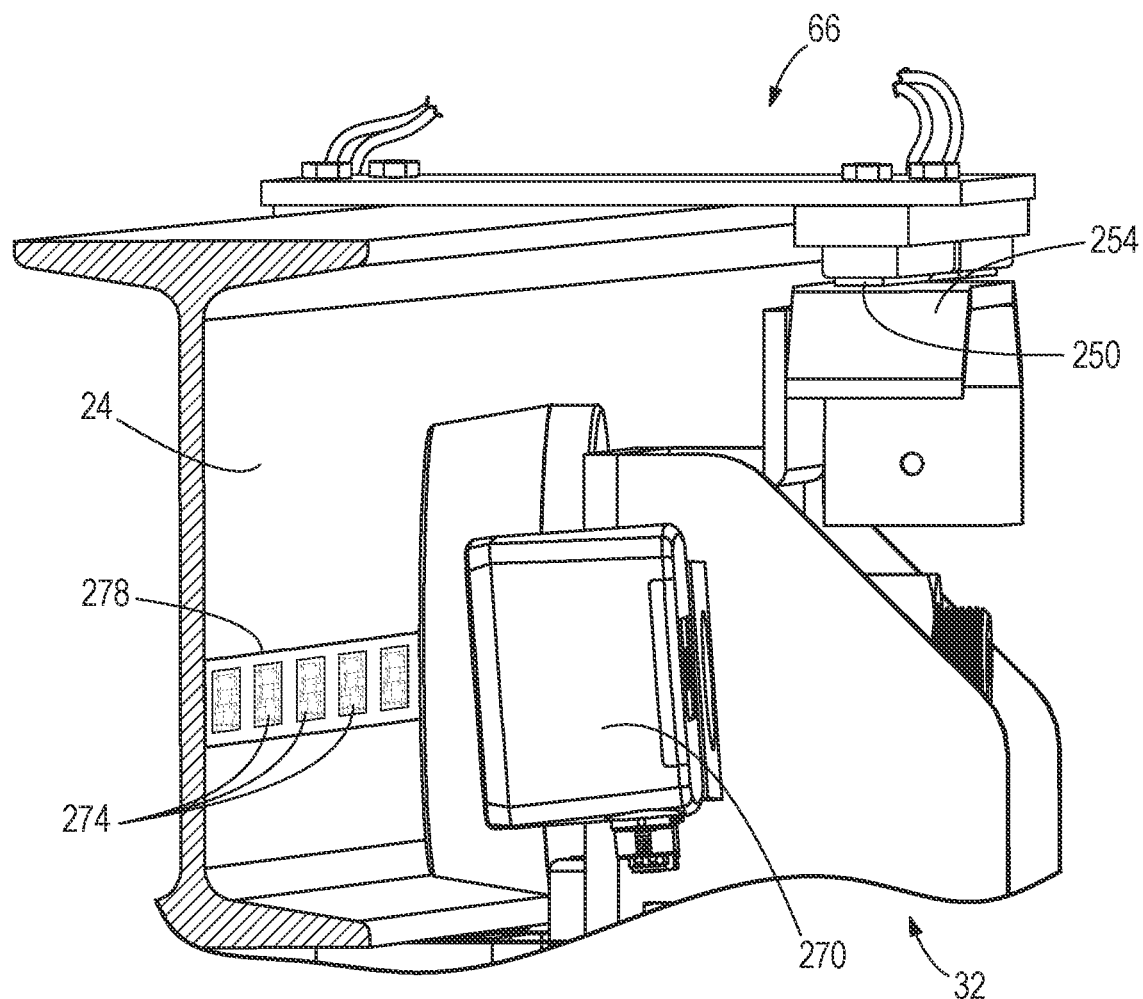
FIG. 5 is a perspective view of an upper portion of the self-driving trolley having a position-tracking sensor and a charging contact in physical and electrical connection with a charging contact of a charging station.

With primary reference to FIGS. 4, 5, and 7, the ACC 28 can include at least one sensor 270 configured to monitor the position of the ACC 28 along the rail 24. The sensor 270 can be the idle sensor mentioned above, or separate therefrom. In the illustrated construction, the sensor 270 is supported on the self-driving trolley 32. However, the overall occupancy of the ACC 28 along the rail 24 can be determined by conveyor rail sensing performed at any other known position along the ACC 28. As shown, the sensor 270 is supported on top of the trolley frame 200 and is aimed in a direction transverse to the direction of conveyance and toward the rail 24, just above the adjacent roller 56. As such, the sensor 270 is operable to view at least a portion of the central vertical web 236. The web 236 has thereon a series of sequential markers or codes 274 in position to be read by the sensor 270. The sensor 270 may scan at intervals or continuously in order to observe and identify the markers 274 in order to relay the information to the controller 248 to identify the location of the ACC 28 at a given point in time during operation. The identification of the markers 274 can trigger changes in drive speed, including stopping and starting the ACC 28 in accordance with the necessary processing of the work pieces 48 in the industrial facility. The real time position tracking of the ACC 28 can also be used in conjunction with one or more higher level controllers such as the master LBPU 290, or by device-to-device communication protocol, in order to control or manipulate one or more off-rail devices. For example, any one or more of: sprayers, heaters, valves, turntables, doors, grippers, lifts, etc., may be operated in accordance with the sensed position of the ACC 28. As illustrated, the sensor 270 is a barcode reader or encoder, and the markers 274 are individual barcodes (e.g., two-dimensional barcodes, such as QR codes). Such a system may be implemented as a PXV Data Matrix Positioning System available from Pepperl+Fuchs. Voltage to the sensor 270 can be provided from the same batteries 50 that power the motor 204, for example through a transformer that steps down the voltage. Power and communication (e.g., Ethernet) wires to the sensor 270, which are shown in FIG. 4), can be routed through the flexible conduit 124. Further, a plurality of markers 274 are provided on a continuous strip 278 that is applied, for example adhesively or magnetically, onto the rail 24. The spacing between consecutive markers 274 can be less than 100 mm, less than 50 mm, and even less than 25 mm such that high precision location data is available from the sensor 270. When the markers 274 are applied throughout all portions of the rail 24 in the conveyor system 20, this enables continuous location tracking of each ACC 28 throughout the system 20. In some constructions, the location tracking is performed with a redundant system, for example also reading the color of each marker 274 in addition to the coded value thereof.

Figure 2:
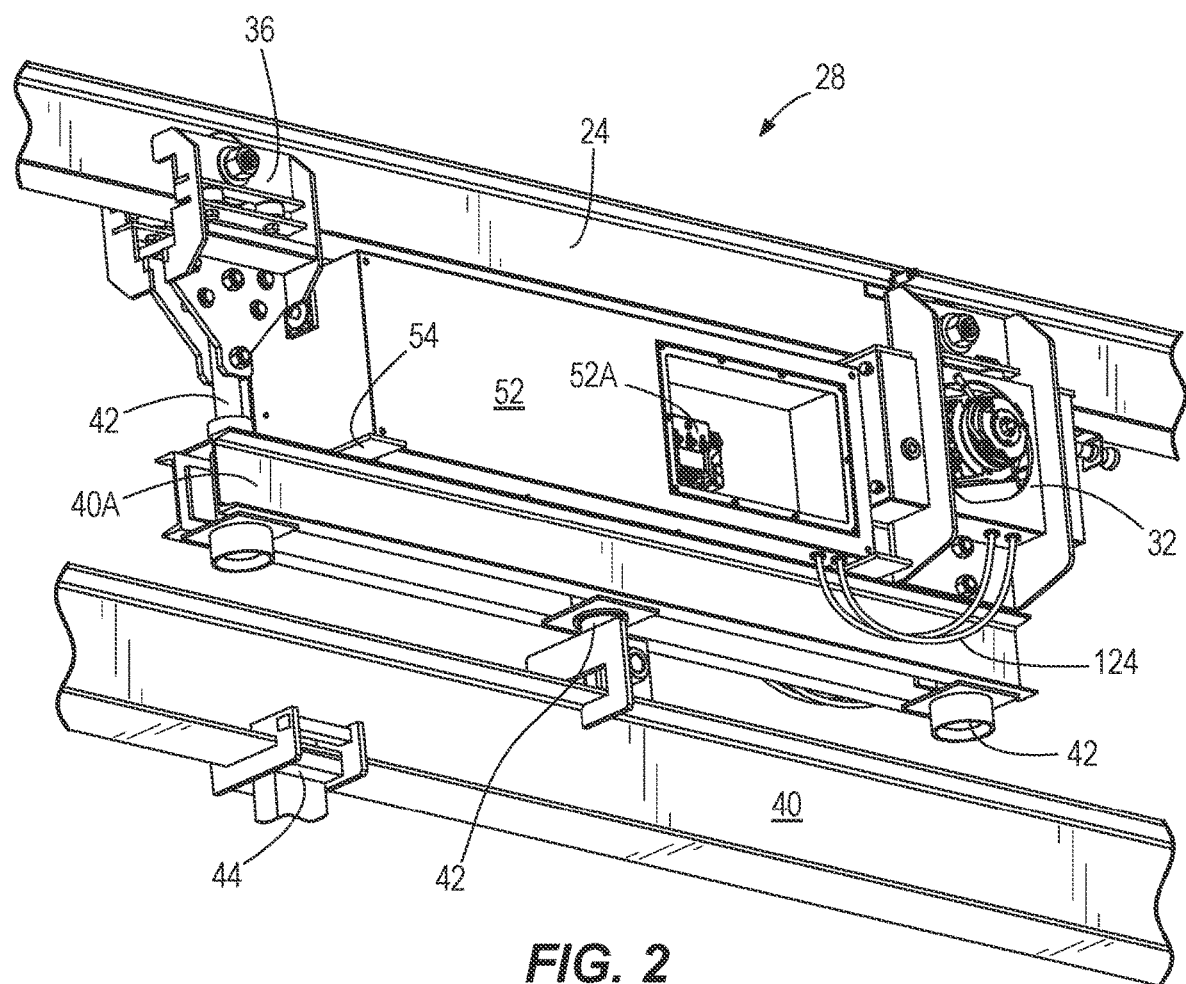
FIG. 2 is a perspective view of a driven portion of the automated conveyor carrier of FIG. 1.
Figure 3:
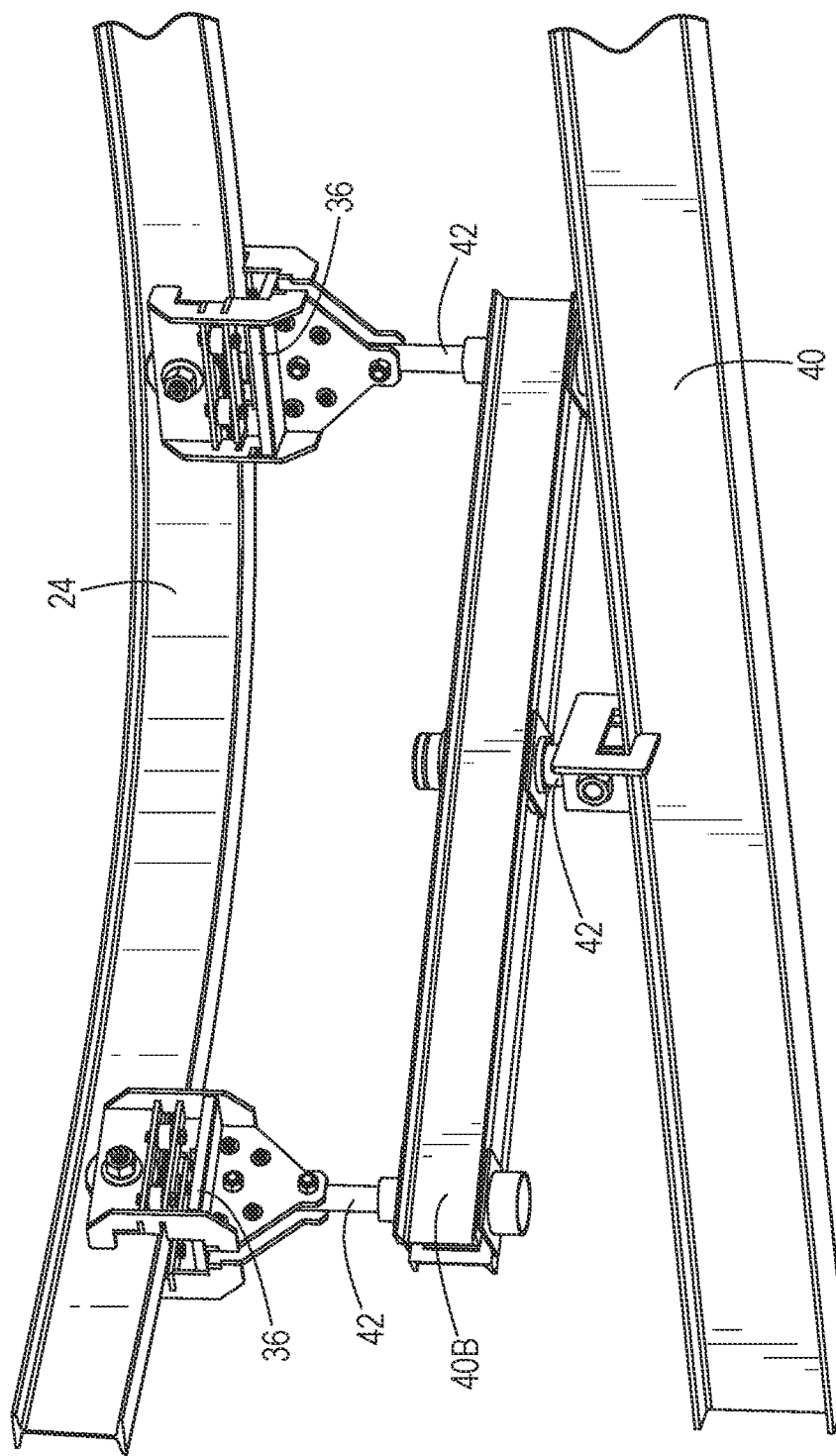
FIG. 3 is a perspective view of a non-driven portion of the automated conveyor carrier of FIG. 1.

In some constructions, each ACC 28 transmits data from its sensor 270 to the main master LBPU 290 (e.g., on the wireless network 294) as schematically illustrated in FIG. 12. In some constructions, the ACC locations are determined without the use of wireless triangulation. Each ACC 28 includes, for example within the enclosure 52 (FIG. 12), the wireless communication module 300 for wireless data transmission of the various control signals, including those to and from the main master LBPU 290, communication with the charger 66, etc. The wireless communication module 300 can be positioned in an electronics section 304 of the enclosure 52 that is separate from the battery section 308 that houses the batteries 50. The respective sections 304, 308 can be physically separated by a barrier or simply maintained as separate portions of the overall interior space within the enclosure 52. The electronics section 304 can also contain communications cables (e.g., Ethernet) for transporting electronic data among the various electronic components on the ACC 28. In order to accommodate wireless signal transmission between an interior of the enclosure 52 and the exterior, the enclosure 52 can have at least one non-metallic panel 52A (FIG. 2). The remainder of the enclosure 52 may be of steel or other metallic construction. The panel 52A can be constructed of thermoplastic, for example acrylic glass.

Figure 14:
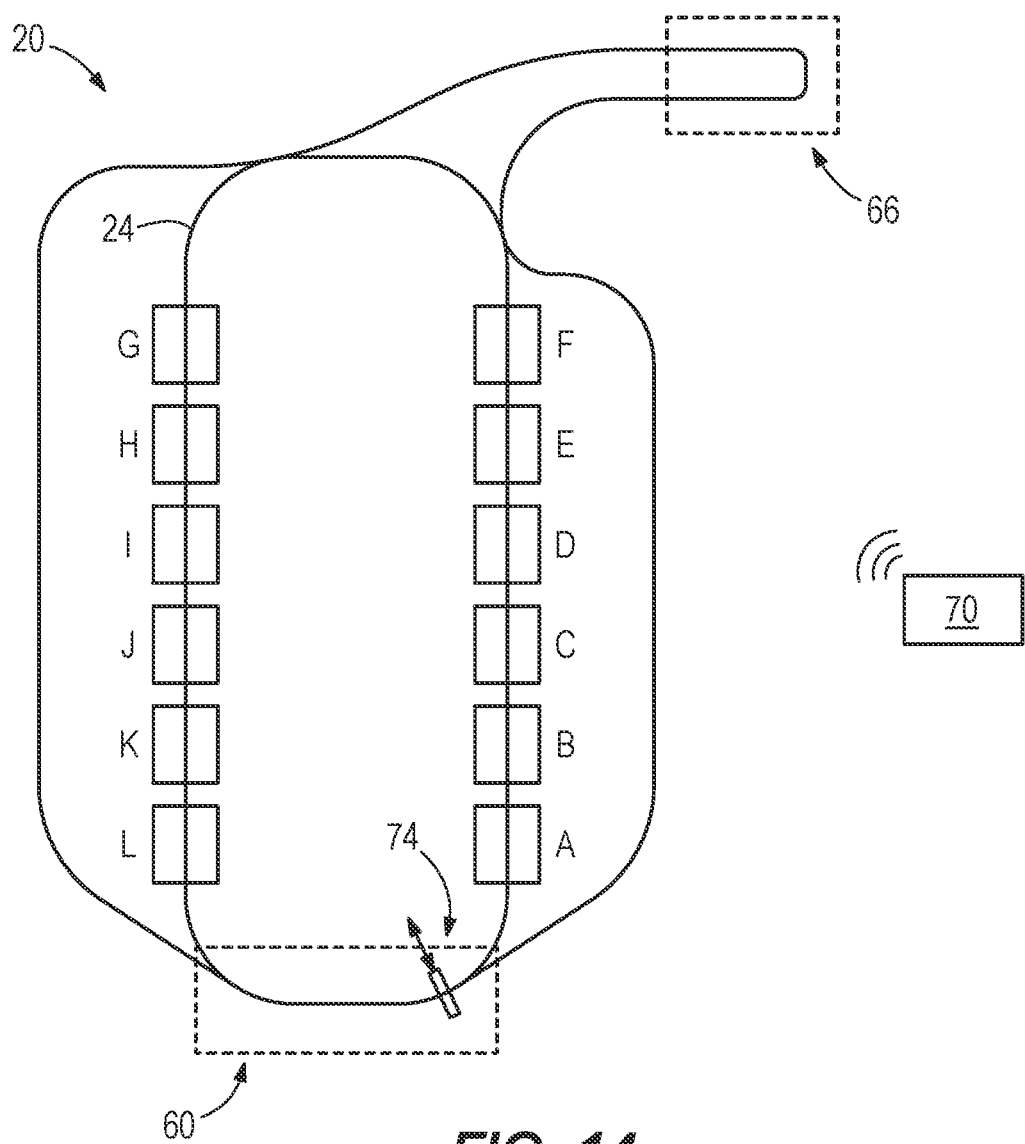
FIG. 14 is a plan view of the conveyor system, illustrating a plurality of work stations for work pieces conveyed by the conveyor system, along with alternate conveyor rail paths and a charging station.

FIG. 14 is a simplified exemplary plan view of the conveyor system 20. As shown, the conveyor rail 24 may form a loop for the primary conveyor path. The path may extend along or through a number of work stations, such as those labeled A-L. It is also noted that the conveyor rail 24 may also include bypass paths that bypass certain work stations. A designated station 60 is provided for work piece loading and/or unloading. At the loading/unloading station 60 a human worker may load untreated work pieces 48 and/or unload treated work pieces 48 for further processing or transit. Although the station 60 is shown as a single station at one end of the conveyor loop, it is possible to provide separate or multiple stations for loading and/or unloading (e.g., at the opposite end of the loop). It is also noted that the human worker may be supplemented or replaced by machines including but not limited to autonomous vehicles, robots, etc. An electrical charger(s) (e.g., charging station 66 described above) for charging the on-board batteries 50 of ACCs 28 can be provided in the station 60, as the trolleys 32 are normally stationary within the station 60 for a period of time. It is also optional to locate one or more additional chargers at other locations along the conveyor loop. However, in further constructions, whether or not any chargers are located along the process loop, the conveyor system 20 can include at least one dedicated charging station 66 along at least one path of the conveyor rail 24. Any of the charging stations described herein can be contact chargers operable for charging through mechanical connection of contacts, or alternatively wireless chargers operable for charging wirelessly. Individual charging stations can be positioned directly above or directly alongside the conveyor rail 24, for example, for interfacing with the self-driving trolleys 32 while mounted on the rail 24. The conveyor system 20 can include an active fleet of self-driving trolleys 32 (and/or entire ACCs 28) that exceeds the number actually in-use to complete the treatment process, such that some are charging while others are working. In other constructions, there is no dedicated off-time for any of the self-driving trolleys 32 (and/or entire ACCs 28) while the treatment process is in operation. The batteries 50 may be charged only at process shut-down times, or actively charged at one or more points along the process path while the process is in operation.

As described further below, the ACCs 28 provide complete control for individual self-routing. Each self-driving trolley 32 allows for complete control of speed, and acceleration/deceleration profiles of the ACC 28 and the work piece(s) 48 thereon, for example, configured to maximize throughput in a given process work flow along the conveyor system 20. This is achieved with the complete absence of any power rail. Compared to conventional power and free systems, the use of the ACCs 28 removes the need for the majority of the pneumatic and electrical infrastructure. Further, it removes the need for wheel turns and roller turns because there is no power chain as with the current overhead power and free style conveyor systems. Further, it removes the need for the power only chain required to close loop a conveyor path (with conventional power and free, 10 to 50 percent of the chain installed in a system is power only required to close loop the conveyor chain). Accordingly, there is no need for conveyor chain drives, conveyor chain lubricators, conveyor chain take-ups, etc. Removing the chain lubricators in particular provides for a much cleaner system and may expand the industrial processes that can be served. The noise level of the conveyor is also greatly reduced over the noise associated with a chain style overhead power and free system.

Figure 15:
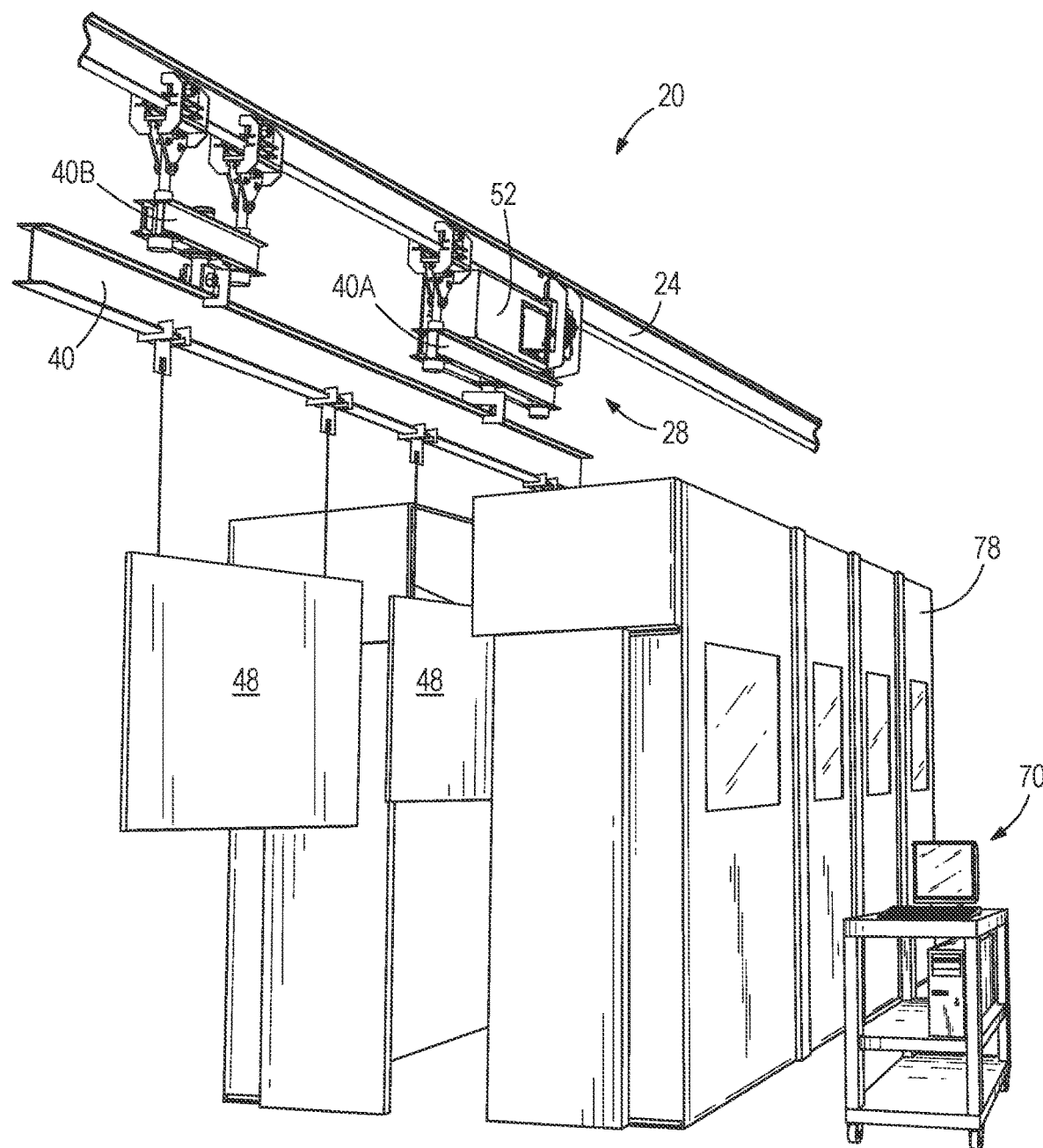
FIG. 15 is a perspective view of a portion of the conveyor system including an automated conveyor carrier conveying one or more work pieces through a slot top oven or furnace.

The on-board controller 248 of each ACC 28 can be configured to provide driving instructions to the on-board motor(s) 204. The driving instructions may be executed from a predetermined program stored in an internal memory. In other words, the ACC 28 can be pre-programmed and operate within the conveyor system 20 to carry out the treatment process according to the designated program instructions (e.g., including travel distances, slow or fast zones, accel/decel ramp profiles, etc.). The ACCs 28 may be programmed, for example, to accelerate at a lower rate between a powder coating application work station and a heating/curing work station, as compared to acceleration rates elsewhere in the system as the adhesion between the coating and the work piece 48 is not particularly strong immediately after application. However, in addition to carrying out the pre-programmed instructions, each ACC 28 may also be configured to wirelessly communicate with the master LBPU 290, which can be accessed via at least one external terminal device 70 (FIGS. 14 and 15). The external terminal device 70 may take the form of a traditional desktop or laptop computer, or mobile computing device such as a personal electronic device. The external terminal device 70 may provide a display and human interface for providing alterations, overrides, or complete re-programming of the master LBPU 290, and in turn, the ACC on-board controllers 248. The external terminal device 70 may also provide real time monitoring of performance parameters and/or locations of any or all of the ACCs 28.

It is noted that the ACCs 28 may include additional powered on-board features not typically available in a power and free conveyor system. For example, automated collision avoidance systems may be incorporated into the ACCs 28 to avoid collisions in the event of a system malfunction of one or more of the ACCs 28. In one example, the ACCs 28 include respective GPS sensors, or other positional sensors (including but not limited to the sensors 260, 270), to identify their respective locations and relative position with respect to other ACCs 28. The ACCs 28 may be network-connected through any suitable means and monitored for position, ensuring a minimum spacing distance therebetween, so that an ACC 28 will operate to abort its normally programmed routine to stop energization of the motor(s) 204 and/or apply a brake, external or within the motor, if a potential collision is identified. Alternately, or additionally, each of the ACCs 28 can accomplish a similar result even without a network, by independently monitoring their immediate surroundings (e.g., with a proximity sensor, radar sensor, laser sensor, camera, etc.). Although these features can be used in an emergency failsafe sense, they may also be utilized as part of the normal operation. For example, when one of the ACCs 28 is being loaded or unloaded in the station 60, the exact duration of the stop may not be exactly predictable, and may be a function of worker availability or other parameters. The worker may have control of the restarting of the stopped ACC 28 either by providing a signal electronically, or by the use of a retractable mechanical obstruction 74 (FIG. 14) that is detected by the ACC 28, the ACC 28 stopping upon identifying the obstruction 74 being extended into the travel path. A trailing or upstream ACC 28 approaching the station 60 may detect the presence of the downstream ACC 28 and stop before coming into contact, or even before entering the station 60, even if the primary program instructions tell the ACC 28 to proceed for loading/unloading. This decision can be made based on a signal obtained from direct sensing by sensors on-board the ACC 28 and/or based on one-way or two-way communication between the ACCs 28, which may be capable of reporting their respective positions to each other.

In addition to the specific examples provided herein, the ACCs 28 can be operable with numerous other forms of on-board or off-board diagnostics. Some of these can include: charge condition, battery life or ability to charge, roller/wheel wear, and physical damage indicators. For example, wear may be detected by monitoring a distance between a reference surface of the trolley 32 and the conveyor rail 24 since the diameter of the wheel 216 directly affects this distance or offset. Alternately, wear may be identified by computing a diameter of the wheel 216 by measuring an actual distance traveled (e.g., with the sensor 270 and the rail markers 274 or alternately GPS, laser, or identification of fixed intervals) and comparing to a known number of revolutions applied by the motor(s) 204. If the diameter measured is under a predetermined threshold, the self-driving trolley 32 may identify itself as having a worn wheel 216 and requiring maintenance or replacement. Such a trolley 32 may drive itself (and the associated ACC 28) to a designated service area (e.g., the charging station 66 or a separate area) where a technician can take appropriate action. The ACC 28 may also report its condition to the master LBPU 290. The ACC 28 may alternately, or additionally display a coded service indicator (e.g., via externally visible light, such as LED, or a display screen) directly at an exterior thereof.

One of the work stations A-L along the conveyor system 20 can include an enclosure 78 as shown in FIG. 15. The enclosure 78 can be temperature-controlled such as an oven having heaters to raise the temperature therein. In other constructions, the enclosure 78 can be a spray booth in which liquid(s) are sprayed or a powder coating booth where airborne coating particles exist. The enclosure 78 may or may not have doors at the upstream and downstream ends. Even with doors capable of closing, the enclosure 78 may or may not form a sealed enclosure in all constructions. The environment within the enclosure 78 may be a harsh or caustic environment due to one or more of extreme temperature, chemical gases or liquids, etc. required to carry out a particular function within the treatment process. Though not illustrated here, the rail 24 may extend directly through the interior of the enclosure 78, being directly exposed to the actual treatment environment. The enclosure 52 accompanying each of the self-driving trolley 32 can be explosion-proof, flame-tight, and/or dust-ignitionproof as defined by the NEC. In some embodiments, each enclosure 52 is hermetically sealed from the process environment with respect to gases, vapors, and/or liquids (flammable or otherwise). In the illustration of FIG. 15, the ACC 28 does not enter the enclosure 78 but rather drives along the rail 24 extending over the top of the enclosure 78, with the work piece support structure 44 extending through a slot in the top or roof of the enclosure 78 so that the work pieces are conveyed through the treatment space of the enclosure 78 by movement of the ACC 28 along the overhead rail 24. In some embodiments, whether or not the ACC 28 enters a heated enclosure, the ACC enclosure 52 can have one or more means for heat protection, in addition to the basic wall construction (e.g., sheet) forming the outer housing of the ACC enclosure 52, to limit heat transfer between the process environment and the internal batteries 50 and electrical devices. However, while protective in any one or more of the various aspects mentioned above, the enclosure 52 can be transmissive to wireless signals. Alternately, a wireless transmitter and/or antenna may be located on an exterior of the enclosure 52. Examples of heat protection are shown in FIGS. 20A-20D.

FIG. 20A illustrates that at least a bottom wall of the ACC enclosure 52 can be shielded with a reflective heat shield 522 to limit the heat transfer to the enclosure 52 and its contents. The heat shield 522 can wrap at least partially up the side walls of the enclosure 52, and may extend up to the top wall of the enclosure 52. The heat shield 522 can be bonded to the enclosure 52 wall(s) and/or attached with individual mechanical fasteners. FIG. 20B illustrates that a layer of thermal insulation 524 may be provided along the bottom wall of the enclosure 52, and optionally also along the side walls thereof. The insulation layer 524 can include foam, fiberglass, and/or other available thermal insulators. The insulation layer 524 can be separate from the enclosure walls and coupled thereto (e.g., situated along internal surfaces of the enclosure walls), or may be integrated therewith such that the housing of the enclosure 52 is constructed of insulated wall panels (e.g., composite panels). As schematically illustrated in FIG. 20B, the insulation layer 524 does not shield the enclosure 52 from heat, but rather limits heat transfer through the wall to the internal contents. FIG. 20C illustrates another construction in which the enclosure 52 is provided with a passive heat absorbing device 526. In one construction, the passive heat absorbing device 526 includes a contained quantity of phase change material adapted to absorb heat (e.g., through melting) during exposure of the enclosure 52 to elevated temperature environments. In another construction, the passive heat absorbing device 526 can include a thermoelectric cooler (e.g., Peltier device powered by dedicated batteries or the ACC batteries 50). As schematically illustrated, the passive heat absorbing device 526 operates to absorb heat within the enclosure 52, reducing the heat absorbed by the batteries 50 and other electrical devices. Finally, FIG. 20D illustrates a construction in which the enclosure 52 is provided with an active air conditioning system 528 operating a refrigerant fluid through a refrigeration circuit. In this way, heated air within the enclosure 52 can give up heat to the refrigerant of the air conditioning system 528 (e.g., evaporating the refrigerant within an evaporator), and the conditioned air can be returned to the enclosure 52. At least part of the air conditioning system 528 can be mounted outside the enclosure 52. The active air conditioning system 528 can be operated selectively by the internal controller 248 or the external control module 70. In some constructions, the active air conditioning system 528 can have its operation triggered automatically based on sensed temperature (e.g., from a thermocouple measuring internal temperature of the enclosure 52 or the enclosure's surroundings) or a detected position, which may or may not be obtained from the sensor 270. In one example, there may be a predetermined threshold temperature above which the active air conditioning system 528 is triggered to turn on. In another example, the active air conditioning system 528 is triggered to turn on at a predetermined time or distance upstream of an expected heat exposure, such as that of an oven enclosure. In this way, the interior of the enclosure 52 is pre-charged with cold air, thus entering the heated environment in better condition to limit the maximum internal temperature. It should also be noted that some or all of the structures described individually with respect to FIGS. 20A-20D can be used in concert.

Wireless communications between ACCs 28 and/or between the external control module 70 and any/all of the ACCs 28 can be radio signals, utilizing radio frequency (RF) transmitters operable to emit RF signals and antennas operable to receive RF signals. The wireless communications can be completed within the context of an established wireless network, for example WLAN, Wi-Fi, etc.

The conveyor system 20 including the ACCs 28 having the self-driving trolleys 32 can be used in conjunction with a wide variety of industrial systems or combinations thereof, including without limitation chemical treatment systems, cleaning systems, assembly lines, ovens, chillers, refrigerators, or freezers, and the like.

Figure 16:
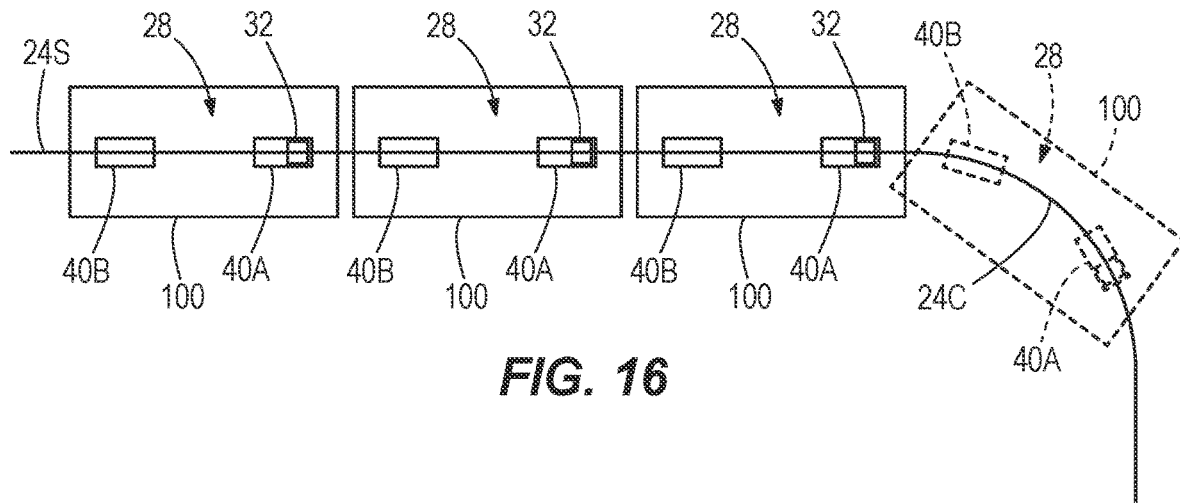
FIG. 16 is a plan view of a portion of the conveyor system including close-packed automated conveyor carriers in a straight conveyor portion prior to a curved conveyor portion.

FIG. 16 illustrates a portion of the conveyor system 20, including a straight rail portion 24S and a curved rail portion 24C downstream of the straight rail portion 24S. A number of identical ACCs 28 are illustrated on the straight rail portion 24S. Each ACC 28 supports any or all of a load bar 40, a work piece support structure 44, and a work piece(s) 48, collectively referred to herein as a load 100. As shown in the plan view of FIG. 16, each load 100 defines an outer perimeter (e.g., rectangular as shown, although the outer perimeter may have alternate shapes). The loads 100 conveyed along the straight rail portion 24S are conveyed, as controlled by the self-driving trolleys 32, with a high line density defined, for example, as number of loads per unit length. Line density can be defined in a number of ways, and may be interchangeable with other similar measures such as carrier-to-carrier spacing (e.g., distance between consecutive ACCs 28, or distance from an self-driving trolley 32 to a nearest downstream trolley 36). In any case, spacing between loads 100 is kept relatively small and may even be minimized to the point of a practical minimum that will avoid contact between loads 100 during a normal amount of longitudinal swinging. The loads 100 may be conveyed along the straight rail portion 24S at a first speed. Although speeds within straight rail portions may vary according to different locations within the conveyor system 20, in at least some instances, the speeds are kept relatively low, especially where the straight rail sections extend through or along work stations such that work station consumables (e.g., fluid of a bath or tank, fluid pumping energy, heat energy in an oven, etc.) and/or work stations themselves (e.g., tank or oven lengths, and subsequently components thereof such as pumps, heaters) can be limited or down-sized. However, the existence of curved rail portions such as indicated at 24C can lead to the occurrence where consecutive loads 100 would interfere with each other. This is shown by the dashed line ACC 28 and associated load 100, which is navigating the curved rail portion 24C while maintaining the line density of the straight rail portion 24S. In order to avoid such collisions, each ACC 28 may be accelerated in a transition zone leading into the curved rail portion 24C. The transition zone can include a downstream part of the straight rail portion 24S and/or an upstream part of the curved rail portion 24C. Thus, in at least some constructions, the ACCs 28 are accelerated within the curved rail portion 24C. In other constructions, the ACCs 28 are accelerated within the straight rail portion 24S, prior to reaching the curved rail portion 24C. The aforementioned acceleration leading into a conveyor path curve, which increases carrier-to-carrier gap spacing, may be generally contrary to conventional thought in which loads would desirably be conveyed at their highest speeds within straight conveyor runs and then slowed down to navigate curves. Slowing down for curved conveyor sections can be advantageous in some circumstances, but carrier-to-carrier spacing cannot be minimized (e.g., line density is lower than could otherwise be achieved) because each carrier must necessarily slow down from the first, higher speed to the second lower speed at a given point just prior to the curve, thus reducing the carrier-to-carrier gap spacing. While explained above as a curve visible in plan view (i.e., a horizontal curve), the same may also be applied to the transitions into upward or downward slopes, which may be referred to as vertical curves, or elevator sections. The above description of increasing the carrier-to-carrier gap spacing for the curved rail portion 24C is one example of the conveyor system 20 operating with the ACCs 28 programmed to maintain at least two different minimum carrier-to-carrier spacing distances in different conveyor sections.

Figure 17:
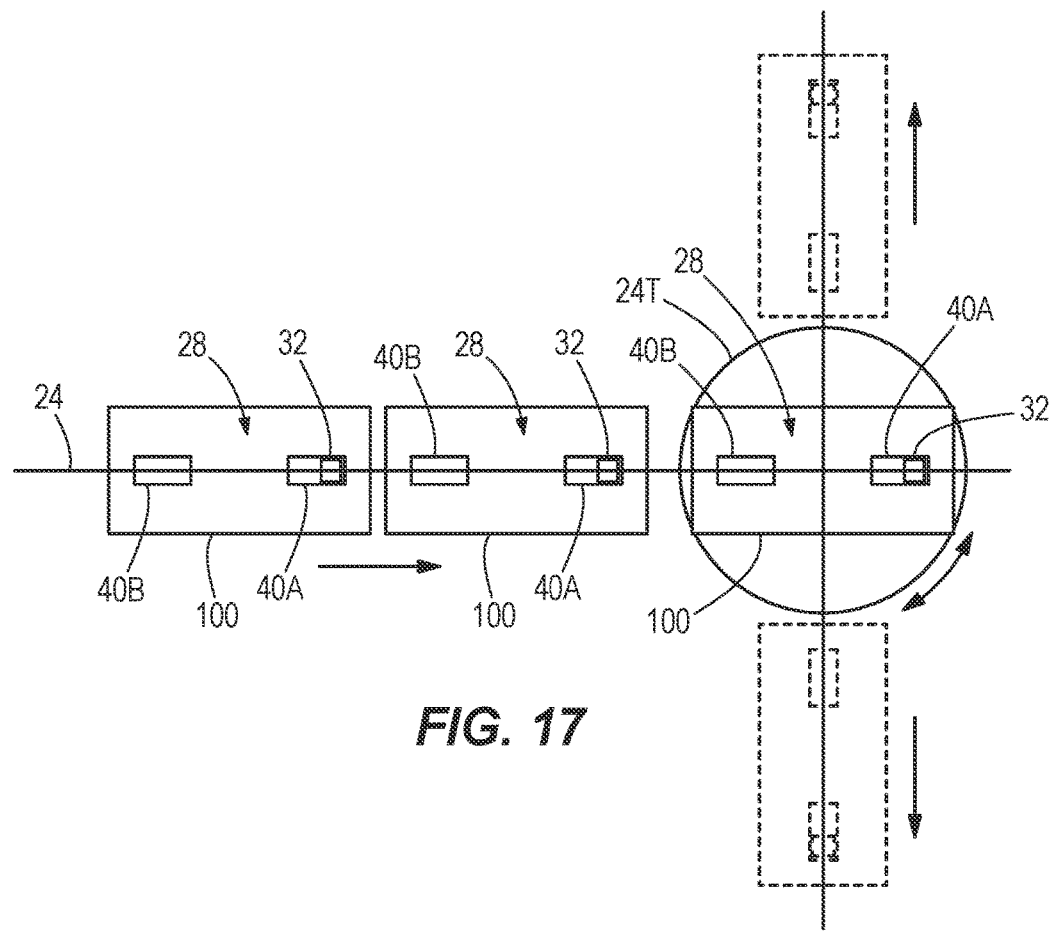
FIG. 17 is a plan view of a portion of the conveyor system including a rotary turntable conveyor portion.
Figure 18:
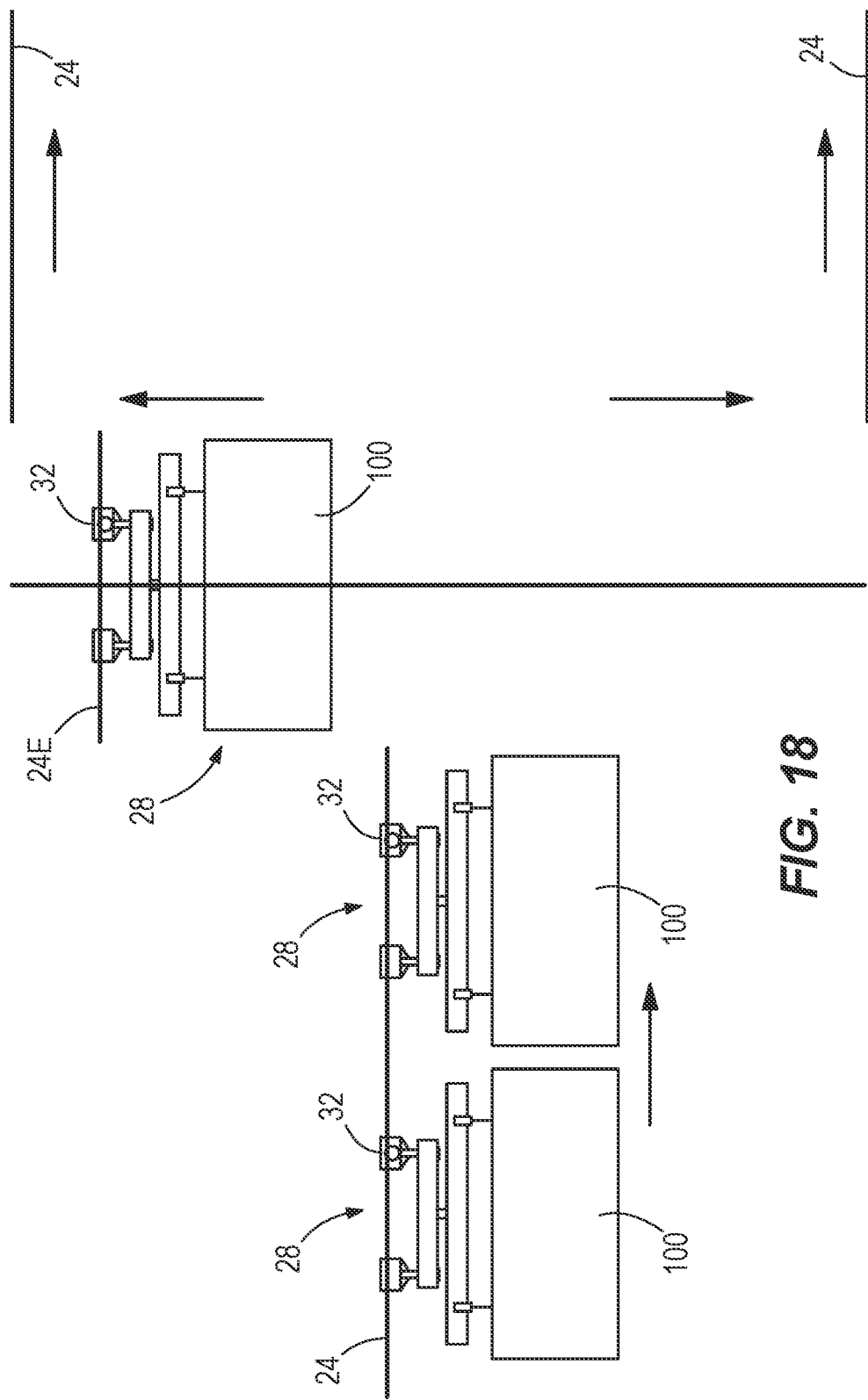
FIG. 18 is a plan view of a portion of the conveyor system including an elevator conveyor portion.

In addition to the navigation of curved sections within the conveyor system 20, certain aspects of the invention may include transitions that include more abrupt directional changes, such as a side shift or vertical shift at a defined switch point. Such a shift can in some constructions include a rotary turntable rail portion 24T having movable conveyor rail portion(s) thereon as shown in FIG. 17. As such, the conveyor can include a true intersection point or angled turn. Although two opposite 90-degree turns from the original incoming conveyor rail path are illustrated, other combinations are optional, including different numbers of outlet paths and differently-angled outlet paths. The self-driving trolley 32 can drive the ACC 28 onto the turntable rail portion 24T, then stop and pause while the turntable rotates to orient the ACC 28 to the desired outlet path, which information may be preprogrammed into the master LBPU 290, or optionally directed from the ACC 28 as it arrives at the turntable rail portion 24T. The self-driving trolley 32 then drives the ACC 28 off the turntable rail portion 24T once aligned with the desired outlet path. As shown in FIG. 18, the conveyor system 20 can include an elevator rail portion 24E that supports at least one ACC 28 for vertical movement along a track to allow vertical movement directly away from an upstream portion of the rail 24, which may be a horizontal rail portion. The self-driving trolley 32 can drive the ACC 28 onto the elevator rail portion 24E, then stop and pause while the elevator rail section is driven to a downstream portion of the rail 24 that is at a different height, higher or lower than the incoming portion of the rail 24. In some constructions, a drive system (chain, belt, gear train, etc.) that moves the elevator rail portion 24E along the vertical track can be powered from the self-driving trolley 32, thus providing a cart-powered lift, such that a drive source need not be integrated into the conveyor infrastructure. In other words, the drive system used to power part of the conveyor infrastructure may receive drive power from a driven wheel of the self-driving trolley 32 positioned thereon. Similarly, a drive system (chain, belt, gear train, etc.) that moves the turntable rail portion 24T of FIG. 17 can be powered from the self-driving trolley 32 such that a drive source need not be integrated into the conveyor infrastructure.

Although it is mentioned above that the various ACCs 28 within the conveyor system 20 can have independent speeds and acceleration or deceleration profiles, it is also noted that the self-driving trolleys 32 enable more diverse types of movements among the ACCs 28 within the same conveyor system, and more particularly within a single rail 24 thereof. For example, given ample spacing, different ACCs 28 or groups thereof may move in opposite longitudinal directions along the rail 24. For example, a given ACC 28 may traverse two work stations and then cycle back through those work stations while a further-upstream ACC 28 occupies a single further-upstream work station or moves in a downstream-only direction toward the further-downstream ACC 28. It is also envisioned that one or more ACCs 28 may oscillate forward and backward along a conveyor rail 24, e.g., within one or more work stations, while other ACCs 28 on the same rail 24, including at least one directly adjacent ACC 28, are stationary or moving in a single forward direction.

In areas where the self-driving trolleys 32 are responsible for driving the ACCs 28 through a work station, and where different types of loads 100 are being conveyed, the self-driving trolleys 32 can traverse the work station with different speed profiles based on at least one characteristic of the load supported (e.g., responsive to weight, type of applied coating on the work piece(s), etc.). Such information about the load 100, either provided as a data transmission to the ACC 28 or sensed locally by the ACC 28, can be stored in a memory of the self-driving trolley 32 and used to execute corresponding program instructions while driving through the work station(s). In some aspects, characteristics of the load 100 may be sensed directly by one or more sensors of the self-driving trolley 32 so as not to require the conveyance of outside information to the self-driving trolley 32. For example, a load cell can be incorporated into the ACC 28 or the structures that suspend the load 100 from the ACC 28. In either case, the load cell can be in communication with the ACC's internal controller 248 to provide electrical signals indicative of the sensed weight of the load 100. Providing load-dependent ACC 28 operation can include setting or updating a set of instructions (e.g., location-based speed and acceleration/deceleration profiles) programmed to the internal controller 248.

In some constructions, it is not only the speed of load conveyance through a work station that can be independently managed, but alternately or additionally, the load-to-load gaps. Such gaps can be changed by independently controlling acceleration and deceleration of adjacent ACCs 28. One specific example is the conveyance of loads 100 to one or more paint spray work stations in a close-packed configuration with relatively small gaps therebetween. Although the ACCs 28 may be conveyed toward the paint spray work station at relatively high speed from an upstream station, speed of a downstream one of the ACCs 28 may be increased as it approaches the paint spray station to create an increased gap to limit the effects of overspray among adjacent loads 100. Once the requisite gaps are created, the ACCs 28 may move through the paint spray work station at a reduced speed more conducive to applying the paint. Paint spray represents one example of a spray work station, of which there are others, and these aspects of the invention also apply to other work stations other than those where the load 100 is sprayed.

In some constructions, an ACC 28 can include at least two self-driving trolleys 32. In some cases, two self-driving trolleys 32 exert drive energy to move the ACC 28 along the rail 24. However, one of the self-driving trolleys 32 may be left in a neutral or free-wheeling state during normal operation while the other is responsible for driving along the rail 24. In certain instances, the second self-driving trolley 32 may be utilized to provide additional functionality. One such example, referred to as diagonal banking, is illustrated in FIG. 19. As shown, a second conveyor rail 24 is branched from the first conveyor rail 24. The two self-driving trolleys 32 of a single ACC 28 can then drive along two parallel rails 24 to effectively turn the loads 100 perpendicular to their normal conveyance direction. Assuming the loads 100 are longer (length L) in the normal conveyance direction (in which the load bars 40 extend parallel to the rail 24), turning of the loads 100 to a perpendicular orientation in which the carrier width W extends along the conveyance direction can further maximize the load density for close-packing of loads 100 beyond what is possible when the ACCs 28 are in their normal orientation along one rail 24. The substantial increase in load density, which corresponds to the ratio of length L to width W, can be at least 20 percent, and optionally 30 percent or more, 40 percent or more, or even 50 percent or more. It is noted that the length L and width W are labeled in FIG. 19 as being the dimensions of the load 100, which is the relevant dimension for avoiding contact when the load 100 is both longer and wider than the structure of the ACC 28 carrying the load 100. However, in other scenarios, the length L and width W can be the actual length and width of the ACC 28, and the above text can be interpreted as such. One or both of the length L and width W of the ACC 28 may in some cases be larger than the corresponding load dimension(s). Finally, while FIG. 19 relates to an embodiment having multiple self-driving trolleys 32, it is also conceivable to turn the ACCs 28 from one to two rails 24 as shown and to drive the ACCs 28 along the two rails 24 as shown on the right side of FIG. 19 by way of a single self-driving trolley 32, along with a free-rolling trolley 36. For example, the various load bars 40, 40A, 40B may be lockable into a fixed orientation matching the desired configuration, e.g., by selectively locking the respective pivots 42.

Unless otherwise noted or expressly prohibited, any of the separately disclosed features or embodiments may be combined together in various forms, resulting in additional embodiments not explicitly referred to herein. These and other adaptations will be recognized as being within the spirit and scope of the present disclosure.

What is claimed is:

1. A method of operating a conveyor system, the method comprising:
   providing a fixed, non-powered first rail defining a conveyor path, the first rail supporting first and second trolleys of a carrier, at least one of which is a self-driving trolley including an on-board motor and electrical power source;
   conveying the carrier under its own power such that the first and second trolleys are in line along the first rail with a load bar extended therebetween, the carrier defining a length measured along a longitudinal extent of the first rail and a width measured transverse to the longitudinal extent of the first rail, wherein the carrier is conveyed to a branch point where a second rail branches from the first rail; and
   conveying the first trolley along the first rail past the branch point and conveying the second trolley along the second the rail past the branch point to turn the carrier so that it is conveyed with the load bar extending transversely from the first rail to the second rail, wherein the width is substantially less than the length such that the turning of the carrier reduces an occupancy of the carrier along the first rail.

2. The method of claim 1, wherein, past the branch point, the carrier is conveyed with its width parallel to the longitudinal extent of the first rail.

3. The method of claim 1, further comprising providing a pivot between the carrier and the load bar, and locking the load bar into a fixed orientation by selectively locking the pivot after the second trolley has branched from the first rail to the second rail.

4. The method of claim 1, wherein the second trolley trails the first trolley on the first rail prior to reaching the branch point.

5. The method of claim 1, wherein the first and second trolleys are both self-driving trolleys such that, past the branch point, the carrier is conveyed by driving the first trolley along the first rail and driving the second trolley along the second rail.

6. The method of claim 5, wherein, prior to reaching the branch point, the second trolley is in a free-wheeling state such that the carrier is conveyed exclusively by the first trolley.

7. The method of claim 1, wherein the first trolley is the only self-driving trolley of the carrier such that, on both sides of the branch point, the carrier is conveyed by driving the first trolley along the first rail.

8. The method of claim 7, further comprising providing a pivot between the carrier and the load bar, and locking the load bar into a fixed orientation by selectively locking the pivot after the second trolley has branched from the first rail to the second rail.

9. A conveyor system comprising:
   a fixed, non-powered first rail defining a conveyor path;
   a carrier including first and second trolleys supported on the first rail, wherein at least one of the first and second trolleys is a self-driving trolley including an on-board motor and electrical power source;
   a load bar extending between the first and second trolleys; and
   a second rail branched from the first rail at a branch point;
   wherein the carrier defines a length and a width measured transverse to the length, the width measuring substantially less than the length,
   wherein, in a first configuration, the carrier is supported entirely by the first rail and configured to be driven by the self-driving trolley so that the length extends along the first rail, and
   wherein, in a second configuration, the carrier is jointly supported by the first and second rail such that the length does not extend along the first rail, thus reducing an occupancy of the carrier along the first rail.

10. The conveyor system of claim 9, further comprising a pivot provided between the carrier and the load bar, the pivot being selectively lockable into a fixed orientation.

11. The conveyor system of claim 9, wherein, in the second configuration, the carrier is conveyed with its width parallel to the longitudinal extent of the first rail.

12. The method of claim 9, wherein the second trolley is situated behind the first trolley on the first rail in the first configuration.

13. The conveyor system of claim 9, wherein the first and second trolleys are both self-driving trolleys.

14. The conveyor system of claim 13, wherein the second trolley is in a free-wheeling state in the first configuration and in a self-driving state in the second configuration.

15. The conveyor system of claim 9, wherein the first trolley is the only self-driving trolley of the carrier such that the carrier is drivable solely by the first trolley in both the first and second configurations.

16. The conveyor system of claim 15, further comprising a pivot provided between the carrier and the load bar, the pivot being selectively lockable into a fixed orientation.

17. The conveyor system of claim 16, wherein the pivot is unlocked in the first configuration and locked in the second configuration.

18. A conveyor system comprising:
   a fixed, non-powered first rail defining a conveyor path;
   a carrier including first and second trolleys supported on the first rail, wherein at least one of the first and second trolleys is a self-driving trolley including an on-board motor and electrical power source;

a load bar extending between the first and second trolleys; and a second rail branched from the first rail at a branch point, the carrier being drivable with both the first and second trolleys on the first rail in a first configuration and the carrier being drivable with the first and second trolleys on the respective first and second rails in a second configuration;

a pivot provided between the carrier and the load bar, the pivot being selectively lockable into a fixed orientation.

19. The conveyor system of claim 18, wherein the pivot is provided directly at the first or second trolley.

20. The conveyor system of claim 18, wherein the pivot is provided at an intermediate load bar between the load bar and one of the first or second trolleys.

* * * * *